United States Patent
Hicks

(10) Patent No.: US 12,283,727 B2
(45) Date of Patent: Apr. 22, 2025

(54) HYDROGEN-PRODUCING FUEL CELL SYSTEMS AND METHODS OF OPERATING THE SAME

(71) Applicant: H2 PowerTech, LLC, Bend, OR (US)

(72) Inventor: Michael Tyler Hicks, Bend, OR (US)

(73) Assignee: H2 PowerTech, LLC, Bend, OR (US)

( * ) Notice: Subject to any disclaimer, the term of this patent is extended or adjusted under 35 U.S.C. 154(b) by 338 days.

(21) Appl. No.: 17/889,295

(22) Filed: Aug. 16, 2022

(65) Prior Publication Data

US 2024/0063411 A1  Feb. 22, 2024

(51) Int. Cl.
*H01M 8/0438* (2016.01)
*H01M 8/04082* (2016.01)
*H01M 8/04223* (2016.01)
*H01M 8/04302* (2016.01)
*H01M 8/04537* (2016.01)
(Continued)

(52) U.S. Cl.
CPC ... *H01M 8/04432* (2013.01); *H01M 8/04201* (2013.01); *H01M 8/04231* (2013.01); *H01M 8/04302* (2016.02); *H01M 8/04604* (2013.01); *H01M 8/04679* (2013.01); *H01M 8/04753* (2013.01)

(58) Field of Classification Search
CPC ......... H01M 8/04432; H01M 8/04201; H01M 8/04231; H01M 8/04302; H01M 8/04604; H01M 8/04679; H01M 8/04753; H01M 8/04089; H01M 8/04388; H01M 8/04425
USPC ....................................................... 426/400
See application file for complete search history.

(56) References Cited

U.S. PATENT DOCUMENTS 2,824,620 A  2/1958 Rosset
3,336,730 A  8/1967 McBride et al.
(Continued)

FOREIGN PATENT DOCUMENTS

CA  2317452  8/1999
CA  2276205  10/2002
(Continued)

OTHER PUBLICATIONS

Musket, R.G., Effects of Contamination on the Interaction of Hydrogen Gas with Palladium: A Review, *Journal of Less-Common Metals*, 45, 173-183 (1976).
(Continued)

*Primary Examiner* — Christian Roldan
(74) *Attorney, Agent, or Firm* — KOLITCH ROMANO DASCENZO GATES LLC

(57) ABSTRACT

Hydrogen-producing fuel cell systems and methods of operating the same. The methods include initiating supply of a stored hydrogen stream, which includes stored hydrogen gas, to a fuel cell stack. Prior to the initiating, the stored hydrogen gas is stored in a low-pressure hydrogen storage tank at a hydrogen storage pressure. The methods also include generating an electrical power output from the stored hydrogen gas with the fuel cell stack. The methods further include, during a supply time interval that is subsequent to the initiating, monitoring a hydrogen supply variable that is indicative of flow of the stored hydrogen stream to the fuel cell stack. The methods also include detecting a change in the hydrogen supply variable and responding to the detecting. The systems include a controller that is programmed to perform the methods.

24 Claims, 4 Drawing Sheets

(51) Int. Cl.
*H01M 8/04664* (2016.01)
*H01M 8/04746* (2016.01)

(56) References Cited

U.S. PATENT DOCUMENTS

| | | | |
|---|---|---|---|
| 3,338,681 A | 8/1967 | Kordesch |
| 3,350,176 A | 10/1967 | Green et al. |
| 3,432,356 A | 3/1969 | Christianson |
| 3,443,115 A | 5/1969 | Timmerman, Jr. |
| 3,469,944 A | 9/1969 | Bocard et al. |
| 3,522,019 A | 7/1970 | Buswell et al. |
| 3,580,741 A | 5/1971 | Hovious et al. |
| 3,655,448 A | 4/1972 | Setzer |
| 3,823,358 A | 7/1974 | Rey |
| 3,857,735 A | 12/1974 | Louis et al. |
| 4,000,003 A | 12/1976 | Baker et al. |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,310,605 A | 1/1982 | Early et al. |
| 4,342,816 A | 8/1982 | Kothmann et al. |
| 4,349,613 A | 9/1982 | Winsel |
| 4,351,405 A | 9/1982 | Fields et al. |
| 4,377,445 A | 3/1983 | Grimes |
| 4,390,602 A | 6/1983 | Struthers |
| 4,411,967 A | 10/1983 | Yano |
| 4,468,235 A | 8/1984 | Hill |
| 4,642,273 A | 2/1987 | Sasaki |
| 4,820,594 A | 4/1989 | Sugita et al. |
| 4,839,574 A | 6/1989 | Takabayashi |
| 4,883,724 A | 11/1989 | Yamamoto |
| 4,904,548 A | 2/1990 | Tajima |
| 4,988,283 A | 1/1991 | Nagasawa et al. |
| 5,006,846 A | 4/1991 | Granville et al. |
| 5,084,073 A | 1/1992 | Prasad |
| 5,139,894 A | 8/1992 | Mizuno et al. |
| 5,141,824 A | 8/1992 | Hirota |
| 5,154,986 A | 10/1992 | Takechi et al. |
| 5,204,610 A | 4/1993 | Pierson et al. |
| 5,229,222 A | 7/1993 | Tsutsumi et al. |
| 5,240,473 A | 8/1993 | Carolan et al. |
| 5,334,463 A | 8/1994 | Tajima et al. |
| 5,366,818 A | 11/1994 | Wilkinson et al. |
| 5,366,821 A | 11/1994 | Merrit et al. |
| 5,401,589 A | 3/1995 | Palmer et al. |
| 5,432,710 A | 7/1995 | Ishimaru et al. |
| 5,462,815 A | 10/1995 | Horiuchi |
| 5,532,072 A | 7/1996 | Spaeh et al. |
| 5,624,768 A | 4/1997 | Tanokura |
| 5,631,532 A | 5/1997 | Azuma et al. |
| 5,637,414 A | 6/1997 | Inoue et al. |
| 5,658,681 A | 8/1997 | Sato et al. |
| 5,677,073 A | 10/1997 | Kawatsu |
| 5,709,961 A | 1/1998 | Cisar et al. |
| 5,712,052 A | 1/1998 | Kawatsu |
| 5,714,276 A | 2/1998 | Okamoto |
| 5,733,435 A | 3/1998 | Prasad et al. |
| 5,763,113 A | 6/1998 | Meltser et al. |
| 5,771,476 A | 6/1998 | Mufford et al. |
| 5,795,666 A | 8/1998 | Johnssen |
| 5,798,186 A | 8/1998 | Fletcher et al. |
| 5,861,137 A | 1/1999 | Edlund |
| 5,880,677 A | 3/1999 | Lestician |
| 5,897,766 A | 4/1999 | Kawatsu |
| 5,927,416 A | 7/1999 | de Re et al. |
| 5,929,538 A | 7/1999 | O'Sullivan et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,013,385 A | 1/2000 | DuBose |
| 6,045,772 A | 4/2000 | Szydlowski et al. |
| 6,045,933 A | 4/2000 | Okamoto |
| 6,083,637 A | 7/2000 | Walz et al. |
| 6,096,449 A | 8/2000 | Fuglevand et al. |
| 6,103,410 A | 8/2000 | Fuller et al. |
| 6,110,612 A | 8/2000 | Walsh |
| 6,165,633 A | 12/2000 | Negishi |
| 6,214,484 B1 | 4/2001 | Hauer |
| 6,221,117 B1 | 4/2001 | Edlund et al. |
| 6,319,306 B1 | 11/2001 | Edlund et al. |
| 6,375,906 B1 | 4/2002 | Edlund et al. |
| 6,376,113 B1 | 4/2002 | Edlund et al. |
| 6,383,670 B1 | 5/2002 | Edlund et al. |
| 6,406,806 B1 | 6/2002 | Keskula et al. |
| 6,421,593 B1 | 7/2002 | Kempen et al. |
| 6,423,203 B1 | 7/2002 | Faita et al. |
| 6,428,918 B1 | 8/2002 | Fuglevand et al. |
| 6,458,477 B1 | 10/2002 | Hsu |
| 6,494,937 B1 | 12/2002 | Edlund et al. |
| 6,495,277 B1 | 12/2002 | Edlund et al. |
| 6,503,649 B1 | 1/2003 | Czajkowski et al. |
| 6,522,955 B1 | 2/2003 | Colborn |
| 6,534,210 B2 | 3/2003 | Luken et al. |
| 6,537,352 B2 | 3/2003 | Edlund et al. |
| 6,537,690 B1 | 3/2003 | Karrupaiah et al. |
| 6,562,111 B2 | 5/2003 | Edlund et al. |
| 6,569,227 B2 | 5/2003 | Edlund et al. |
| 6,703,722 B2 | 3/2004 | Christensen |
| 6,723,156 B2 | 4/2004 | Edlund et al. |
| 6,764,782 B2 | 7/2004 | Raiser et al. |
| 6,764,785 B2 | 7/2004 | Colborn et al. |
| 6,811,908 B2 | 11/2004 | Edlund et al. |
| 6,835,481 B2 | 12/2004 | Dickman et al. |
| 6,844,100 B2 | 1/2005 | Bourgeois et al. |
| 6,858,335 B2 | 2/2005 | Schmidt et al. |
| 6,890,672 B2 | 5/2005 | Dickman et al. |
| 6,979,507 B2 | 12/2005 | Edlund et al. |
| 7,075,194 B2 | 7/2006 | Weidenheimer et al. |
| 7,087,327 B2 | 8/2006 | Pearson |
| 7,128,769 B2 | 10/2006 | Renn |
| 7,135,048 B1 | 11/2006 | Edlund et al. |
| 7,208,241 B2 | 4/2007 | Edlund et al. |
| 7,222,001 B2 | 5/2007 | Frost et al. |
| 7,247,398 B2 | 7/2007 | Logan et al. |
| 7,250,231 B2 | 7/2007 | Edlund |
| 7,261,962 B1 | 8/2007 | Czajkowski et al. |
| 7,318,971 B2 | 1/2008 | Imamura et al. |
| 7,390,587 B2 | 6/2008 | Dickman et al. |
| 7,399,342 B2 | 7/2008 | Bizjak |
| 7,419,734 B2 | 9/2008 | Pearson |
| 7,442,456 B2 | 10/2008 | Wheat et al. |
| 7,491,457 B2 | 2/2009 | Kearl et al. |
| 7,601,302 B2 | 10/2009 | Edlund et al. |
| 7,659,019 B2 | 2/2010 | Edlund |
| 7,733,311 B2 | 6/2010 | Amundson et al. |
| 7,837,765 B2 | 11/2010 | Adams et al. |
| 7,972,420 B2 | 7/2011 | Pledger et al. |
| 8,021,446 B2 | 9/2011 | Adams et al. |
| 8,617,754 B2 | 12/2013 | Edmiston et al. |
| 8,673,510 B2 | 3/2014 | Pledger |
| 10,476,093 B2 | 11/2019 | Hill et al. |
| 11,316,180 B2 | 4/2022 | Koyama et al. |
| 2001/0045061 A1 | 11/2001 | Edlund et al. |
| 2002/0037443 A1 | 3/2002 | Christen et al. |
| 2002/0114984 A1* | 8/2002 | Edlund ............ H01M 8/065 429/444 |
| 2003/0091882 A1 | 5/2003 | Schmidt et al. |
| 2003/0192251 A1 | 10/2003 | Edlund et al. |
| 2003/0223926 A1 | 12/2003 | Edlund et al. |
| 2004/0009380 A1 | 1/2004 | Pearson |
| 2004/0053082 A1 | 3/2004 | McCluskey et al. |
| 2004/0126635 A1 | 7/2004 | Pearson |
| 2004/0194384 A1 | 10/2004 | Nguyen |
| 2005/0008909 A1 | 1/2005 | Kaye et al. |
| 2005/0106431 A1 | 5/2005 | Edlund et al. |
| 2005/0106445 A1 | 5/2005 | Mitchell et al. |
| 2005/0112428 A1 | 5/2005 | Freeman et al. |
| 2005/0119842 A1 | 6/2005 | Clingerman et al. |
| 2005/0266284 A1 | 12/2005 | Scharf |
| 2005/0266285 A1 | 12/2005 | Edlund et al. |

(56) References Cited

U.S. PATENT DOCUMENTS

| | | |
|---|---|---|
| 2006/0024540 A1 | 2/2006 | LaVen et al. |
| 2006/0134473 A1 | 6/2006 | Edlund et al. |
| 2006/0172162 A1 | 8/2006 | Pearson |
| 2006/0194082 A1 | 8/2006 | Tucker et al. |
| 2007/0042233 A1 | 2/2007 | Lyman et al. |
| 2007/0093382 A1 | 4/2007 | Vanderspurt et al. |
| 2007/0111058 A1 | 5/2007 | Yoshida |
| 2007/0180991 A1 | 8/2007 | Chellappa et al. |
| 2007/0184315 A1 | 8/2007 | Kelly et al. |
| 2008/0075988 A1 | 3/2008 | Suzuki et al. |
| 2008/0081236 A1 | 4/2008 | Kanashiki |
| 2008/0176118 A1 | 7/2008 | Edlund et al. |
| 2008/0210088 A1 | 9/2008 | Pledger |
| 2009/0155642 A1 | 6/2009 | Popham |
| 2010/0136453 A1 | 6/2010 | Edlund |
| 2019/0273275 A1 | 9/2019 | Hicks |
| 2021/0367252 A1* | 11/2021 | Koyama .......... H01M 8/24 |

FOREIGN PATENT DOCUMENTS

| | | |
|---|---|---|
| DE | 10010985 | 9/2001 |
| EP | 1065741 A2 | 1/2001 |
| JP | S5381923 A | 7/1978 |
| JP | S57111963 | 7/1982 |
| JP | SHO 62-17961 | 1/1987 |
| JP | SHO 62-24570 | 2/1987 |
| JP | SHO 63-236269 | 10/1988 |
| JP | SHO 63-276878 | 11/1988 |
| JP | H02168803 A | 6/1990 |
| JP | HEI 02-214910 | 8/1990 |
| JP | 4-163860 | 6/1992 |
| JP | HEI 09-117062 | 5/1997 |
| WO | WO 00/02282 | 1/2000 |
| WO | WO01/073879 | 10/2001 |
| WO | WO03/017405 | 2/2003 |
| WO | WO08/057832 | 5/2008 |
| WO | WO2016/178849 | 11/2016 |

OTHER PUBLICATIONS

Roa et al., The Effect of Air Exposure on Palladium-Copper Composite Membranes, *Applied Surface Science*, 240, 85-104 (2005).
Way, J.D., Palladium/Copper Alloy Composite Membranes for High Temperature Hydrogen Separation from Coal-Derived Gas Streams, Annual Progress Report for DOE Grant DE-FG26-99FT40585.
Abstract of Japanese Patent No. JPS5381923A, 1978.
Abstract of Japanese Patent No. JPS57111963A, 1982.
English-language abstract of Japanese Unexamined Patent Application Publication No. SHO 62-17961, 1987.
English-language abstract of Japanese Unexamined Patent Application Publication No. 62-24570, 1987.
English-language abstract of Japanese Unexamined Patent Application Publication No. SHO 63-276878, 1988.
English-language abstract of Japanese Patent No. JP 63-236269, 1988.
English-language abstract of Japanese Patent No. JPH02168803A, 1990.
English-language abstract of Japanese Patent No. 4-163860, 1992.
English-language abstract of Japanese Unexamined Patent Application Publication No. HEI 09-117062, 1997.
English-language abstract of Japanese Unexamined Patent Application Publication No. HEI 02-214910, 1998.
English-language abstract of German Patent No. 10010985, 2001.
Nadal, et al., "Development of a Hybrid Fuel Cell/Battery Powered Electric Vehicle," International Journal of Hydrogen Energy, vol. 21, No. 6, pp. 497-505, Jun. 1, 1996.

* cited by examiner

HYDROGEN-PRODUCING FUEL CELL SYSTEMS AND METHODS OF OPERATING THE SAME

FIELD OF THE DISCLOSURE

The present disclosure relates generally to hydrogen-producing fuel cell systems and/or to methods of operating the same.

BACKGROUND OF THE DISCLOSURE

Hydrogen-producing fuel cell systems utilizing a hydrogen-producing device, such as a fuel reformer, to produce hydrogen gas from a carbon-containing feedstock. The hydrogen-producing fuel cell systems also include at least one fuel cell stack configured to produce an electrical power output from hydrogen gas produced by the hydrogen-producing device. Some hydrogen-producing fuel cell systems are utilized as backup or supplemental sources of electrical power output, such as to supplement or backup, primary sources of electrical power output, such as an electrical grid. Some hydrogen-producing fuel cell systems that include a plurality of fuel cell stacks selectively utilize the fuel cell stacks of the plurality of fuel cell stacks, such as responsive to the demand for electrical power output from, or the applied load to, the hydrogen-producing fuel cell system. In both scenarios, when initiating protection of electrical power output by a fuel cell stack after a period in which the fuel cell stack was not producing an electrical power output, there is a potential that the hydrogen-producing fuel cell system is not suitably configured to deliver hydrogen gas to the fuel cell stack. Thus, there exists a need for improved hydrogen-producing fuel cell systems and/or for methods of operating the hydrogen-producing fuel cell systems.

SUMMARY OF THE DISCLOSURE

Hydrogen-producing fuel cell systems (HPFCS) and methods of operating the same. The methods include initiating supply of a stored hydrogen stream, which includes stored hydrogen gas, to a fuel cell stack. Prior to the initiating, the stored hydrogen gas is stored in a low-pressure hydrogen storage tank at a hydrogen storage pressure. The methods also include generating an electrical power output from the stored hydrogen gas with the fuel cell stack. The methods further include, during a supply time interval that is subsequent to the initiating, monitoring a hydrogen supply variable that is indicative of flow of the stored hydrogen stream to the fuel cell stack. The methods also include detecting a change in the hydrogen supply variable, and responding to the detecting.

The systems include a feedstock delivery system configured to provide a feedstock stream that includes a carbon-containing feedstock. The systems also include a fuel processing assembly configured to receive the feedstock stream and to generate a product hydrogen stream, which includes produced hydrogen gas, from the feedstock stream. The systems also include at least one fuel cell stack that is configured to receive gas and to generate an electrical power output from the hydrogen gas. The systems further include a low-pressure hydrogen storage tank configured to receive at least a fraction of the product hydrogen stream and to store the fraction of the product hydrogen stream as stored hydrogen gas. The systems further include a stored hydrogen supply conduit configured to convey a stored hydrogen stream, which includes stored hydrogen gas from the low-pressure hydrogen storage tank, to the at least one fuel cell stack. The systems also include a controller programmed to control the operation of the HPFCS according to the methods.

DETAILED DESCRIPTION AND BEST MODE OF THE DISCLOSURE

Figure 1:
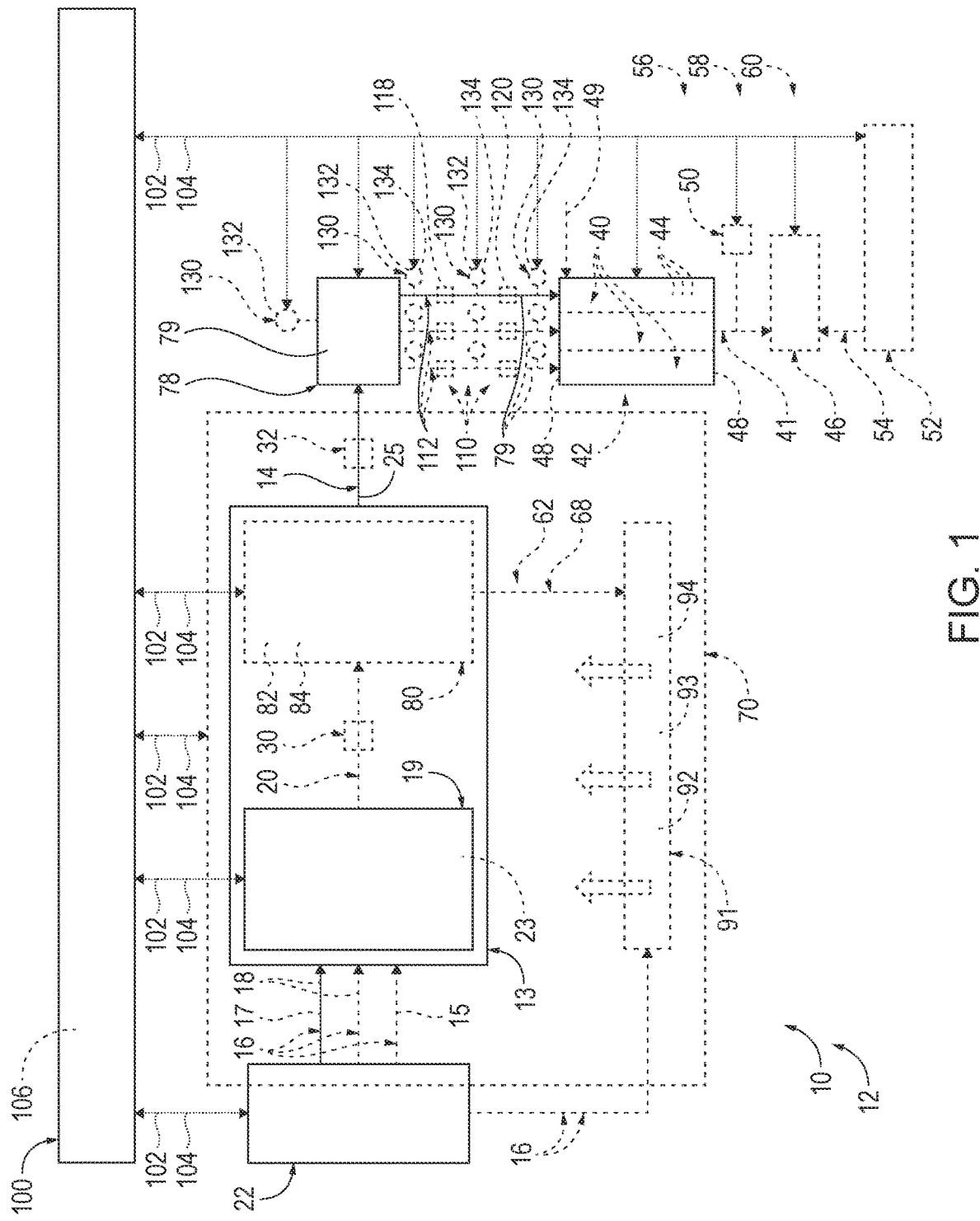
FIG. 1 illustrates examples of hydrogen-producing and consuming assemblies, according to the present disclosure.
Figure 2:
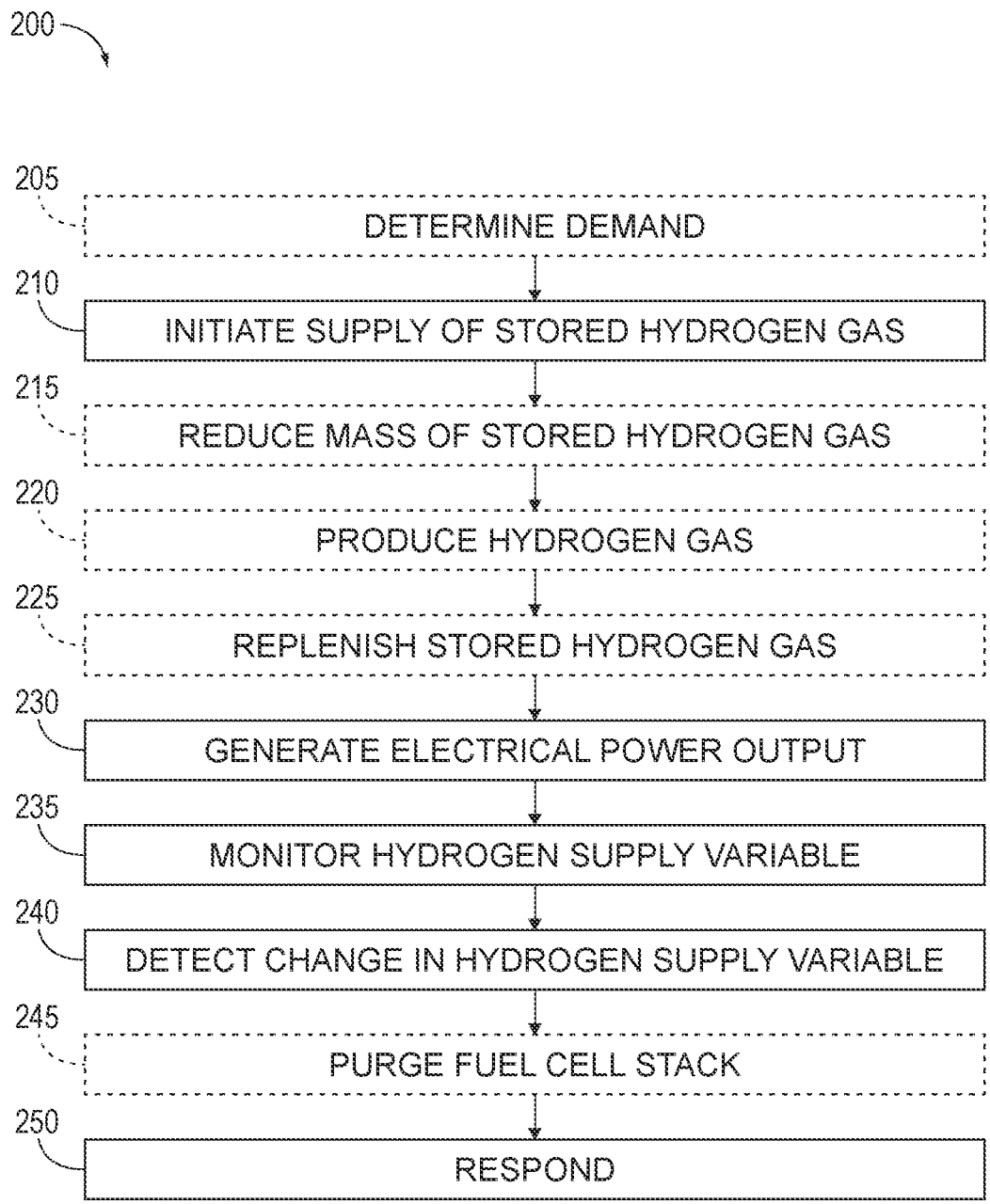
FIG. 2 is a flowchart depicting examples of methods of operating hydrogen-producing fuel cell systems, according to the present disclosure.

FIGS. 1-2 provide examples of hydrogen-producing fuel processing systems 10, of hydrogen-producing and consuming assemblies 12, and/or of methods 200, according to the present disclosure. Elements that serve a similar, or at least substantially similar, purpose are labeled with like numbers in each of FIGS. 1-2, and these elements may not be discussed in detail herein with reference to each of FIGS. 1-2. Similarly, all elements may not be labeled in each of FIGS. 1-2, but reference numerals associated therewith may be utilized herein for consistency. Elements, components, and/or features that are discussed herein with reference to one or more of FIGS. 1-2 may be included in and/or utilized with any of FIGS. 1-2 without departing from the scope of the present disclosure. In general, elements that are likely to be included in a particular embodiment are illustrated in solid lines, while elements that are optional are illustrated in dashed lines. However, elements that are shown in solid lines may not be essential to all embodiment and, in some embodiments, may be omitted without departing from the scope of the present disclosure.

FIG. 1 illustrates examples of hydrogen-producing and consuming assemblies 12 according to the present disclosure. Hydrogen-producing and consuming assemblies 12 include a hydrogen-producing fuel processing system 10. Hydrogen-producing fuel processing system 10 also may be referred to herein as fuel processing system 10, hydrogen generating system 10, and/or fuel reforming system 10. Hydrogen-producing and consuming assembly 12 also includes at least one (i.e., one, a plurality, or more) fuel cell stack(s) 40. The at least one fuel cell stack 40 additionally or alternatively may be referred to as a fuel cell system 42, and hydrogen-producing and consuming assembly 12 also may be referred to herein as a hydrogen-producing fuel cell system (HPFCS) 12. Hydrogen-producing fuel processing systems 10 optionally may be in communication with an energy-consuming device 46, such as to provide an electrical power output 41 to satisfy an applied load from the energy-consuming device. Examples of energy-consuming devices 46 are discussed in more detail herein.

In addition to fuel cell system 42 and/or the one or more fuel cell stacks 40 thereof, hydrogen-producing fuel cell systems 12 according to the present disclosure include a feedstock delivery system 22, a fuel processing assembly 13, a low-pressure hydrogen storage tank 78, a stored hydrogen supply conduit 110, and a controller 100. Feedstock delivery system 22 may be configured to provide at least one feedstock stream 16 to fuel processing assembly 13. Fuel processing assembly 13, in turn, is configured to receive at least one feedstock stream 16 and to generate a product hydrogen stream 14, which includes produced hydrogen gas 25, from the feedstock stream. Fuel processing assembly 13 may include a hydrogen-producing region 19 that produces a mixed gas stream 20 that contains hydrogen gas and other gasses, and fuel processing assembly 13 further may include a separation assembly 80 that receives mixed gas stream 20 and separates the mixed gas stream into product hydrogen stream 14 and at least one byproduct stream 68.

Low-pressure hydrogen storage tank 78 is configured to store hydrogen gas as stored hydrogen gas 79, and the stored hydrogen gas may be stored in the low-pressure hydrogen storage tank at a hydrogen storage pressure, as discussed in more detail herein. The low-pressure hydrogen storage tank 78 may be configured to receive at least a fraction of product hydrogen stream 14 and to store the fraction of the product hydrogen stream as stored hydrogen gas 79. Stored hydrogen supply conduit 110 is configured to convey a stored hydrogen stream 112, which includes stored hydrogen gas 79 from low-pressure hydrogen storage tank 78, to at least one fuel cell stack 40 of fuel cell system 42. The at least one fuel cell stack 40 is configured to receive stored hydrogen stream 112 and to generate electrical power output 41 from the stored hydrogen stream.

Controller 100 is programmed or otherwise configured to monitor, regulate, and/or control the operation of components of HPFCS 12. As an example, and as shown in dashed lines in FIG. 1, controller 100 may be configured to receive status signals 102 that are indicative of the operational status of the various components of hydrogen-producing fuel processing system 10, and controller 100 may generate control signals 104 to control the operation of the various components of hydrogen-producing fuel processing system 10 based at least in part on the value of the status signals, calculations internal to the controller, and/or a control scheme.

This may include monitoring, regulating, and/or controlling at least one component of HPFCS 12 according to any suitable step and/or steps of methods 200. In this context, controller 100 may be programmed or otherwise configured to monitor a hydrogen supply variable that is indicative of flow of the stored hydrogen gas stream from low-pressure hydrogen storage tank 78, such as to detect a change in the hydrogen supply variable, and to respond to the change. As discussed in more detail herein, the controller may be programmed or otherwise configured to detect a change that is greater than or otherwise differs from a threshold hydrogen supply variable change, and responsive to detection of such a change, controller 100 may be configured to respond to this detection.

The components of HPFCS 12 are discussed in more detail herein, along with options for controller 100 to monitor, regulate, and control their operation, after this description initially focuses on aspects of the HPFCS and corresponding methods relating to monitoring and responding to changes in a hydrogen supply variable when a flow of stored hydrogen gas from low-pressure hydrogen storage tank 78 to a fuel cell stack 40 is initiated.

Methods 200 that are schematically represented in the flowchart of FIG. 2 and discussed in more detail herein provide examples of control schemes that controller 100 may utilize to control various components of hydrogen-producing fuel processing system 10. However, it is within the scope of the present disclosure that a portion of methods 200 may be performed manually by a user.

FIG. 2 is a flowchart depicting examples of methods 200 of operating hydrogen-producing fuel cell systems (HPFCS), such as HPFCS 12 of FIG. 1, according to the present disclosure. Methods 200 may include determining a demand at 205, and methods 200 include initiating supply of stored hydrogen gas at 210. Methods 200 also may include reducing the mass of stored hydrogen gas at 215, producing hydrogen gas at 220, and/or replenishing stored hydrogen gas at 225. Methods 200 also include generating an electrical power output at 230, monitoring a hydrogen supply variable at 235, and detecting a change in the hydrogen supply variable at 240. Methods 200 further may include purging a fuel cell stack at 245, and methods 200 include responding at 250.

Determining the demand at 205 may include determining that there is a demand for the electrical power output, such as from the fuel cell stack, by an energy-consuming device. Examples of energy-consuming devices are disclosed herein with reference to energy-consuming device 46.

When methods 200 include the determining at 205, the initiating at 210, and/or the producing at 220 may be based, at least in part, on the determining at 205. Stated differently, the initiating at 210 and/or the producing at 220 may be performed, initiated, and/or continued based upon and/or responsive to the determining at 205. In some examples, and when methods 200 include the determining at 205, the supply time interval may be based upon the determining at 205, may begin responsive to the determining at 205, may begin concurrently with the initiating at 210, may begin immediately after the initiating at 210, and/or may be initiated by the initiating at 210. Stated differently, the supply time interval may include and/or be an initial supply time interval that corresponds to a time period during which stored hydrogen gas has been, or is being, supplied, such as to the given fuel cell stack of the fuel cell system.

Initiating supply of stored hydrogen gas at 210 may include initiating supply of the stored hydrogen gas from the low-pressure hydrogen storage tank to the fuel cell stack via the stored hydrogen supply conduit. The stored hydrogen stream may include stored hydrogen gas; and, prior to the initiating at 210, the stored hydrogen gas may be stored within a low-pressure hydrogen storage tank at a hydrogen storage pressure. Examples of the stored hydrogen gas are disclosed herein with reference to stored hydrogen gas 79. Examples of the stored hydrogen stream are disclosed herein with reference to stored hydrogen stream 112. Examples of the low-pressure hydrogen storage tank are disclosed herein with reference to low-pressure hydrogen storage tank 78. Examples of the hydrogen storage pressure include at least 75 kilopascals gauge (kPag); at least 80 kPag, at least 85 kPag, at least 90 kPag, at least 95 kPag, at least 100 kPag, at least 105 kPag, at least 110 kPag, at least 115 kPag, at least 120 kPag, at least 125 kPag, at least 130 kPag, at least 135 kPag, at least 140 kPag, at least 145 kPag, at least 150 kPag, at least 155 kPag, at least 160 kPag, at least 165 kPag, at least 170 kPag, at least 175 kPag, at least 180 kPag, at least 185 kPag, at least 190 kPag, at most 250 kPag, at most 240 kPag, at most 230 kPag, at most 220 kPag, at most 210 kPag, at most 200 kPag, at most 195 kPag, at most 190 kPag, at most 185 kPag, and/or at most 180 kPag.

The initiating at 210 may be accomplished in any suitable manner. As an example, the initiating at 210 may include opening a stored hydrogen supply valve. Examples of the stored hydrogen supply valve are disclosed herein with reference to stored hydrogen supply valve 118. The opening the stored hydrogen supply valve may include permitting and/or facilitating flow of stored hydrogen gas from the low-pressure hydrogen storage tank to the fuel cell stack within and/or via the stored hydrogen supply conduit. Examples of the stored hydrogen supply conduit are disclosed herein with reference to stored hydrogen supply conduit 110.

In some examples, the HPFCS may include a stored hydrogen supply pressure regulator. Examples of the stored hydrogen supply pressure regulator are disclosed herein with reference to stored hydrogen supply pressure regulator 120. In such examples, the initiating at 210 may include flowing the stored hydrogen stream from the low-pressure hydrogen storage tank, through the stored hydrogen supply pressure regulator, and to the fuel cell stack. In such a configuration, the stored hydrogen supply pressure regulator may be configured to regulate a supply pressure of the stored hydrogen gas to the fuel cell stack.

Reducing the mass of stored hydrogen gas at 215 may include reducing the mass of stored hydrogen gas within the low-pressure hydrogen storage tank. The reducing at 215 additionally or alternatively may be referred to as reducing the quantity and/or amount of stored hydrogen gas within the low-pressure hydrogen storage tank and/or as flowing or otherwise removing stored hydrogen gas from the low-pressure hydrogen storage tank. The reducing at 215 may occur, at least in part, during a startup timeframe for a fuel processing assembly of the HPFCS and/or may be at least partially a result of the initiating at 210. Examples of the fuel processing assembly are disclosed herein with reference to fuel processing assembly 13.

Stated differently, and as discussed in more detail herein, the fuel processing assembly may be configured to generate, or to selectively generate, hydrogen gas; and methods 200 may include performing the initiating at 210 while the fuel processing assembly is not generating hydrogen gas. In such a configuration, the startup timeframe may include and/or be a timeframe necessary for the fuel processing assembly to begin generation of hydrogen gas and/or to generate at least a threshold flow rate of hydrogen gas. During this startup timeframe, a flow rate of hydrogen gas from the low-pressure hydrogen storage tank and within the stored hydrogen stream may be greater than a flow rate of hydrogen gas to the low-pressure hydrogen storage tank and from the fuel processing assembly, resulting in the reducing at 215.

Producing hydrogen gas at 220 may include producing hydrogen gas with and/or within the fuel processing assembly. In some examples, the producing at 220 may include providing at least one feedstock stream, which includes a carbon-containing feedstock, to the fuel processing assembly. In some such examples, the producing at 220 also may include generating, with the fuel processing assembly and/or from the feedstock stream, a product hydrogen stream that includes produced hydrogen gas. In some such examples, the producing at 220 further may include providing the product hydrogen stream to the low-pressure hydrogen storage tank as the stored hydrogen gas. Examples of the feedstock stream are disclosed herein with reference to feedstock stream 16. Examples of the product hydrogen stream are disclosed herein with reference to product hydrogen stream 14. Examples of the low-pressure hydrogen storage tank are disclosed herein with reference to low-pressure hydrogen storage tank 78.

Replenishing stored hydrogen gas at 225 may include replenishing stored hydrogen gas via flow of the produced hydrogen gas stream to and/or into the low-pressure hydrogen storage tank. Additionally or alternatively, the replenishing at 225 may include pressurizing the low-pressure hydrogen storage tank with the product hydrogen stream, such as to the hydrogen storage pressure.

In some examples, the replenishing at 225 may be performed subsequent to the startup timeframe for the fuel processing assembly, during the producing at 220, and/or during supply of the stored hydrogen gas to the fuel cell stack as initiated during the initiating at 210. Stated differently, and subsequent to the startup timeframe, the flow rate of hydrogen gas from the low-pressure hydrogen storage tank and within the stored hydrogen stream may be less than the flow rate of hydrogen gas to the low-pressure hydrogen storage tank and from the fuel processing assembly, resulting in the replenishing at 225.

In some examples, the supply time interval may occur during the replenishing at 225 and/or during pressurization of the low-pressure hydrogen storage tank by the product hydrogen stream. Stated differently, the supply time interval may be a period of time during normal operation of the HPFCS, such as may occur significantly after the initiating at 210 and/or while the fuel processing assembly is generating the product hydrogen stream.

Generating the electrical power output at 230 may include generating the electrical power output from the stored hydrogen gas with the fuel cell stack. Examples of the electrical power output are disclosed herein with reference to electrical power output 41. Examples of the fuel cell stack are disclosed herein with reference to fuel cell stack 40. The generating at 230 may be accomplished in any suitable manner. As an example, and as discussed in more detail herein, the generating at 230 may include reacting the stored hydrogen gas with an oxidant, within the fuel cell stack, to produce and/or generate the electrical power output.

Monitoring the hydrogen supply variable at 235 may include monitoring the hydrogen supply variable during a supply time interval that is subsequent to the initiating at 210. The hydrogen supply variable may be indicative of flow of the stored hydrogen stream to the fuel cell stack. Detecting the change in the hydrogen supply variable at 240 may include detecting that the change in the hydrogen supply variable is greater than a threshold hydrogen supply variable change.

In some examples, and as discussed, the supply time interval may begin immediately after the initiating at 210 and/or may be initiated by the initiating at 210. In some examples, and as also discussed, the supply time interval may occur during normal operation of the HPFCS, such as subsequent to the initiating at 210, during supply of the stored hydrogen stream to the fuel processing assembly, during supply of the product hydrogen stream from the fuel processing assembly to the low-pressure hydrogen storage tank, and/or subsequent to the startup timeframe of the fuel processing assembly.

The supply time interval may have any suitable duration. As examples, the duration of the supply time interval may be at least 5 seconds, at least 10 seconds, at least 15 seconds, at least 20 seconds, at least 25 seconds, at least 30 seconds, a least 35 seconds, at least 40 seconds, at least 45 seconds, at least 50 seconds, at least 55 seconds, at least 60 seconds, at most 120 seconds, at most 110 seconds, at most 100 seconds, at most 90 seconds, at most 80 seconds, at most 70 seconds, at most 60 seconds, at most 55 seconds, at most 50 seconds, at most 45 seconds, at most 40 seconds, at most 35 seconds, and/or at most 30 seconds.

In some examples, the HPFCS may include a hydrogen supply variable detector. The hydrogen supply variable detector may be configured to detect the hydrogen supply variable and/or to detect a parameter that is indicative of the hydrogen supply variable. In such examples, the monitoring at 235 may include monitoring with, via, and/or utilizing the hydrogen supply variable detector. Examples of the hydrogen supply variable detector are disclosed herein with reference to hydrogen supply variable detector 130.

In some examples, the hydrogen supply variable may include, or be, a hydrogen supply pressure of the stored hydrogen gas, such as may be detected by a pressure detector. In such examples, the monitoring at 235 may include monitoring the hydrogen supply pressure. This may include monitoring the hydrogen supply pressure at any suitable location within the HPFCS, examples of which include in the low-pressure hydrogen storage tank, downstream from the low-pressure hydrogen storage tank, upstream from the stored hydrogen supply valve, and/or upstream from the stored hydrogen supply pressure regulator.

In some such examples, the detecting at 240 may include calculating, during the supply time interval, a change in the hydrogen supply pressure. The change in the hydrogen supply pressure may include and/or be a difference between (1) the hydrogen supply pressure prior to the initiating at 210 or prior to the supply time interval, and (2) the hydrogen supply pressure subsequent to the initiating at 210, or during the supply time interval.

In some such examples, the threshold hydrogen supply variable change may include and/or be a threshold hydrogen supply pressure change. Examples of the threshold hydrogen supply pressure change include 30 kPag, 35 kPag, 40 kPag, 45 kPag, 50 kPag, 55 kPag, 60 kPag, 65 kPag, 70 kPag, 75 kPag, 80 kPag, 85 kPag, 90 kPag, 95 kPag, 100 kPag, 105 kPag, 110 kPag, 115 kPag, 120 kPag, 125 kPag, 130 kPag, 135 kPag, or 140 kPag. In some examples, the threshold supply pressure change may include and/or be a threshold pressure change multiple of a nominal supply pressure change, such as may be experienced during the supply time interval, during normal operation of the HPFCS, and/or when there is no hydrogen leak within the HPFCS. Examples of the threshold pressure change multiple include 1.5, 2, 2.5, 3, 3.5, 4, 4.5, 5, 5.5, 6, 6.5, or 7. Examples of the nominal supply pressure change include at most 5 kPag, at most 7.5 kPag, at most 10 kPag, at most 12.5 kPag, at most 15 kPag, at most 17.5 kPag, or at most 20 kPag.

In some examples, the hydrogen supply variable may include, or be, a hydrogen flow rate of the stored hydrogen stream, such as may be detected by a hydrogen flow meter. In such examples, the monitoring at 235 may include monitoring the hydrogen flow rate. This may include monitoring the hydrogen flow rate at any suitable location within the HPFCS, examples of which include downstream from the low-pressure hydrogen storage tank and/or upstream from the fuel cell stack.

In some such examples, the threshold hydrogen supply variable change may include and/or be a threshold hydrogen flow rate magnitude. In some such examples, the threshold hydrogen flow rate magnitude may include and/or be a threshold flow rate multiple of a nominal hydrogen flow rate magnitude, such as may be experienced during the supply time interval, during normal operation of the HPFCS, and/or when there is no hydrogen leak within the HPFCS. Examples of the threshold flow rate multiple include 1.5, 2, 2.5, 3, 3.5, 4, 4.5, 5, 5.5, 6, 6.5, or 7.

In some examples, the fuel cell stack may have a maximum design wattage. In such examples, the threshold hydrogen flow rate magnitude may be a wattage multiple of the maximum design wattage. Examples of the wattage multiple include 18 standard liters per minute per kilowatt (SLPM/kW), 20 SLPM/kW, 30 SLPM/kW, 40 SLPM/kW, 50 SLPM/kW, 60 SLPM/kW, 70 SLPM/kW, 80 SLPM/kW, or 90 SLPM/kW.

Figure 3:
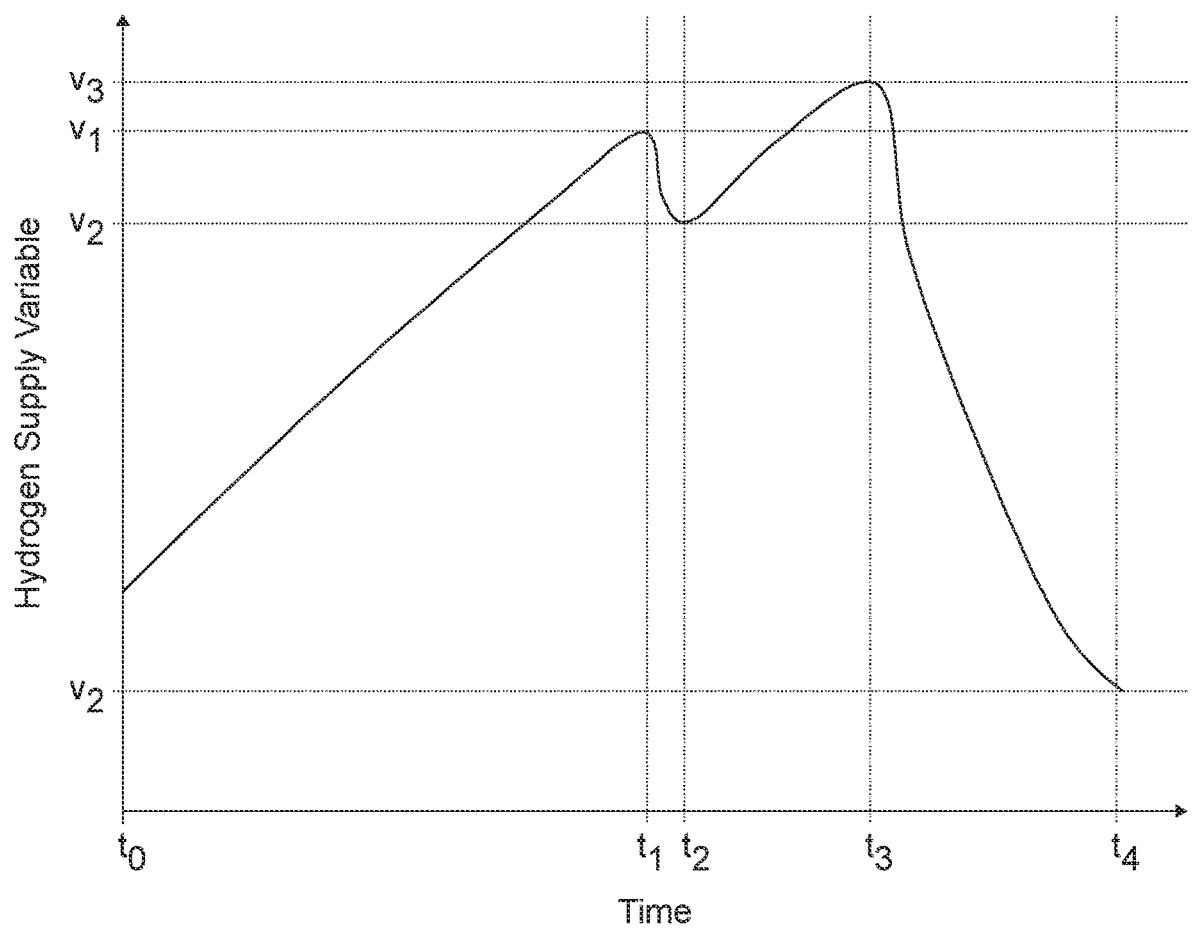
FIG. 3 is a graph schematically illustrating a magnitude of a hydrogen supply variable as a function of time that may be produced by the hydrogen-producing and consuming assemblies and/or that may be utilized with the methods, according to the present disclosure, during startup of a fuel processing assembly.
Figure 4:
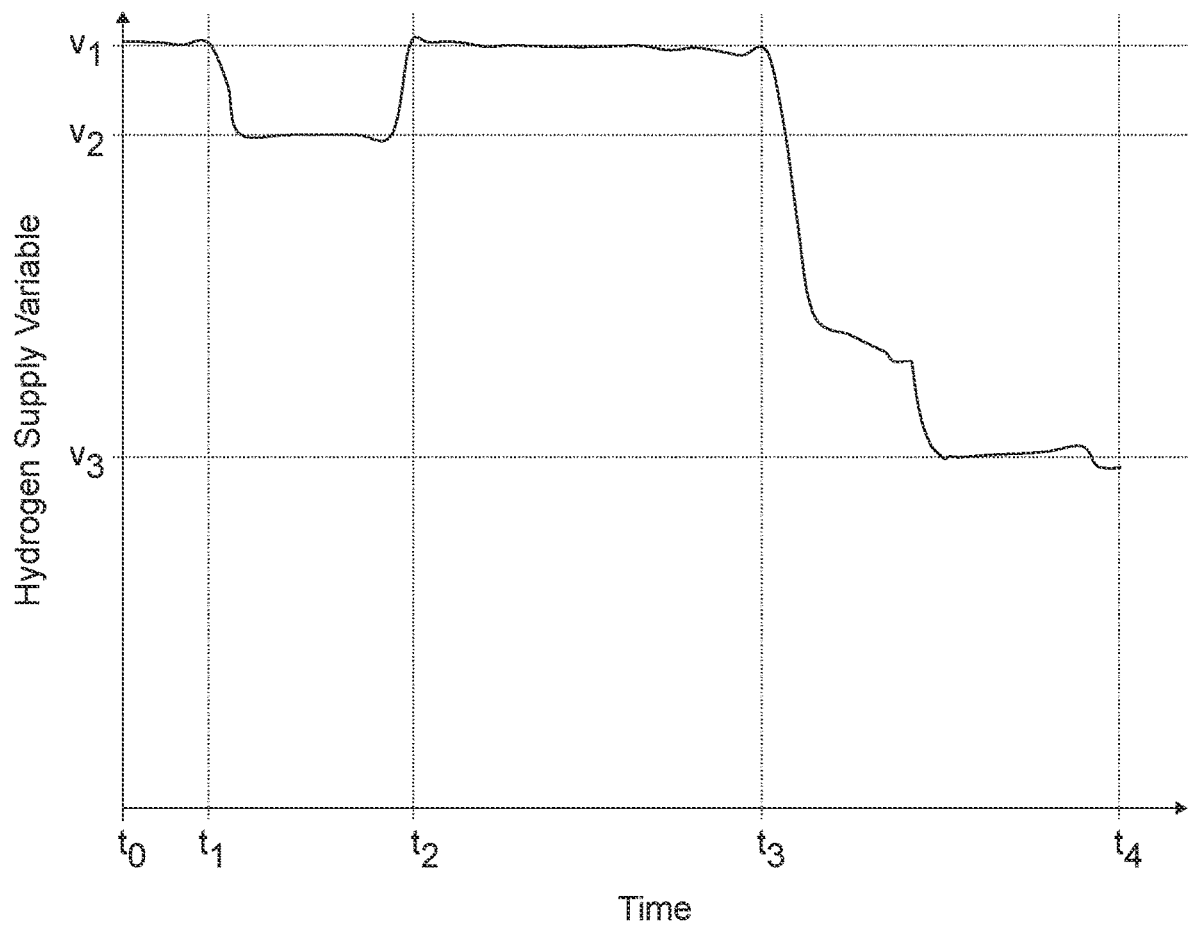
FIG. 4 is a graph schematically illustrating a magnitude of a hydrogen supply variable as a function of time that may be produced by the hydrogen-producing and consuming assemblies and/or that may be utilized with the methods, according to the present disclosure, during steady-state operation of the fuel processing assembly.

Examples of the monitoring at 235 and the detecting at 240 are illustrated in FIGS. 3-4. FIG. 3 is a graph schematically illustrating a magnitude of a hydrogen supply variable, such as hydrogen supply pressure, as a function of time that may be produced by the hydrogen-producing and consuming assemblies and/or that may be utilized with the methods, according to the present disclosure, during startup of a fuel processing assembly. In the example of FIG. 3, the magnitude of the hydrogen supply variable is increasing between time $t_0$ and time $t_1$. This increase with time may be due to the startup of the fuel processing assembly. Stated differently, and during startup, the fuel processing assembly may generate a progressively greater flow rate, volume, or mass of the product hydrogen stream, which may be stored in the low-pressure hydrogen storage tank, producing the time trend that is illustrated in FIG. 3. Then, at time $t_1$ and when the hydrogen supply variable has a magnitude of $v_1$, the initiating at 210 may be performed to initiate supply of stored hydrogen gas to a first fuel cell stack. This may cause a reduction in the mass of stored hydrogen gas within the low-pressure hydrogen storage tank, as discussed herein with reference to the reducing at 215, leading to a decrease in the magnitude of the hydrogen supply variable to a value of $v_2$ at a time $t_2$. This decrease in the magnitude of the hydrogen supply variable (e.g., $v_1$-$v_2$) may be less than the threshold hydrogen supply variable change. As such, the detecting at 240 may not include detecting that the change in the hydrogen supply variable is greater than the threshold hydrogen supply variable change and/or methods 200 may not proceed to the responding at 250.

From time $t_2$ to time $t_3$, the magnitude of the hydrogen supply variable again may increase to a magnitude of $v_3$. Subsequently, at time $t_3$, the initiating at 210 may be performed to initiate supply of stored hydrogen gas to a second fuel cell stack. This again may cause a reduction in the mass of stored hydrogen gas within the low-pressure hydrogen storage tank, as discussed herein with reference to the reducing at 215, leading to a decrease in the magnitude of the hydrogen supply variable to a value of $v_4$ at a time $t_4$. This decrease in the magnitude of the hydrogen supply variable (e.g., $v_3$-$v_4$) may be greater than the threshold hydrogen supply variable change. As such, the detecting at 240 will include detecting that the change in the hydrogen supply variable is greater than the threshold hydrogen supply variable change, and methods 200 will proceed to the responding at 250. Stated differently, FIG. 3 illustrates an example in which the first fuel cell stack does not have a hydrogen gas leak, but the second fuel cell stack does have a hydrogen gas leak, and methods 200 may respond to the hydrogen gas leak within the second fuel cell stack as disclosed herein with reference to the responding at 250.

FIG. 4 is a graph schematically illustrating a magnitude of a hydrogen supply variable, such as hydrogen supply pressure, as a function of time that may be produced by the hydrogen-producing and consuming assemblies and/or that may be utilized with the methods, according to the present disclosure, during steady-state operation of the fuel processing assembly. In the example of FIG. 4, the magnitude of the hydrogen supply variable is stable near a value of $v_1$ between time $t_0$ and time $t_1$. Then, at time $t_1$, the initiating at 210 is performed to initiate supply of stored hydrogen gas to a first fuel cell stack. This may cause a reduction in the mass of stored hydrogen gas within the low-pressure hydrogen storage tank, as discussed herein with reference to the reducing at 215, leading to a decrease in the magnitude of the hydrogen supply variable to a value of $v_2$. This decrease in the magnitude of the hydrogen supply variable (e.g., $v_1$-$v_2$) may be less than the threshold hydrogen supply variable change. As such, the detecting at 240 may not include detecting that the change in the hydrogen supply variable is greater than the threshold hydrogen supply variable change and/or methods 200 may not proceed to the responding at 250.

At time $t_2$, the fuel processing assembly may adjust to the change in hydrogen demand, causing the magnitude of the hydrogen supply variable nominally to return to $v_1$. From time $t_2$ to time $t_3$, the magnitude of the hydrogen supply variable again may be stable near the value of $v_1$. Subsequently, at time $t_3$, the initiating at 210 may be performed to initiate supply of stored hydrogen gas to a second fuel cell stack. This again may cause a reduction in the mass of stored hydrogen gas within the low-pressure hydrogen storage tank, as discussed herein with reference to the reducing at 215, leading to a decrease in the magnitude of the hydrogen supply variable to a value of $v_3$. This decrease in the magnitude of the hydrogen supply variable (e.g., $v_2$-$v_3$) may be greater than the threshold hydrogen supply variable change during a corresponding supply time interval (e.g., $t_4$-$t_3$). As such, the detecting at 240 will include detecting that the change in the hydrogen supply variable is greater than the threshold hydrogen supply variable change and methods 200 will proceed to the responding at 250. Stated differently, FIG. 4 illustrates an example in which the first fuel cell stack does not have a hydrogen gas leak, but the second fuel cell stack does have a hydrogen gas leak, and methods 200 may respond to the hydrogen gas leak within the second fuel cell stack as disclosed herein with reference to the responding at 250.

Purging the fuel cell stack at 245 may include purging the fuel cell stack with, via, and/or utilizing the stored hydrogen stream. This may include purging the fuel cell stack during a purge time interval. The purging at 245, when performed, may be utilized to purge undesired compounds, materials, and/or contaminants from the fuel cell stack. As an example, the purging at 245 may be utilized to remove excess water from the fuel cell stack.

The purging at 245, when performed, may cause the change in the hydrogen supply variable to be greater than the threshold hydrogen supply variable change. However, this may be a result of the purging at 245 and/or may not be the result of a hydrogen leak within the HPFCS. As such, methods 200 may not perform the responding at 250 if the detecting at 240 detects that the change in the hydrogen supply variable is greater than the threshold hydrogen supply variable change while the HPFCS is performing the purging at 245. Stated differently, the supply time interval may be exclusive of the purge time interval and/or may not overlap with the purge time interval. Stated still differently, methods 200 may include omitting the responding at 250 during the purge time interval. By "omitting," it is meant that the methods may include not performing the detecting and/or not performing the responding during the purge time interval. In some such examples, the omitting may include omitting during an omission time period that is a threshold omission time multiple of the purge time interval. Examples of the threshold omission time multiple include at least 1.25, at least 1.5, at least 1.75, at least 2, at least 2.5, at least 3, at least 4, at least 5, at most 10, at most 9, at most 8, at most 7, at most 6, at most 5, at most 4, at most 3, and/or at most 2.

Responding at 250 may include performing at least one action that is based upon, responsive to, and/or initiated by the detecting at 240. In some examples, the responding at 250 may include determining that a hydrogen gas leak exists within the HPFCS, downstream from the low-pressure hydrogen storage tank, and/or within the fuel cell stack.

In some examples, the initiating at 210 may include initiating supply of the stored hydrogen stream to a given fuel cell stack of a plurality of fuel cell stacks of the HPFCS. In some such examples, the responding at 250 may include ceasing supply of the stored hydrogen stream to the given fuel cell stack. In some such examples, methods 200 further may include maintaining supply of the stored hydrogen stream to another fuel cell stack of the plurality of fuel cell stacks subsequent to the ceasing and/or repeating the initiating at 210 to supply the stored hydrogen stream to the other fuel cell stack of the plurality of fuel cell stacks subsequent to the ceasing. Stated differently, and when the HPFCS includes the plurality of fuel cell stacks, methods 200 may be independently applied to one, or to each, fuel cell stack of the plurality of fuel cell stacks.

In a more specific example, the initiating at 210 may include initiating supply of stored hydrogen gas to a first fuel cell stack of the plurality of fuel cell stacks and subsequently initiating supply of stored hydrogen gas to a second fuel cell stack of the plurality of fuel cell stacks. In this example, the detecting at 240 may include detecting the change in the hydrogen supply variable subsequent to initiating supply of stored hydrogen gas to the first fuel cell stack and/or subsequent to initiating supply of stored hydrogen gas to the second fuel cell stack, and the responding at 250 may include performing the at least one action only on and/or to fuel cell stacks that, subsequent to receipt of the stored hydrogen gas, produce and/or generate the change in the hydrogen supply variable. As an example, the change in the hydrogen supply variable may be detected subsequent to performing the initiating at 210 for the second fuel cell stack but may not be detected subsequent to performing the initiating at 210 for the first fuel cell stack. In this example, the responding at 250 may include performing the at least one action on the second fuel cell stack; however, the at least one action may not be performed on the first fuel cell stack.

In some examples, the responding at 250 may include initiating a system diagnostic test of the HPFCS, of at least one fuel cell stack of the HPFCS, and/or of the plurality of fuel cell stacks of the HPFCS. In some examples, the responding at 250 may include notifying an operator of the HPFCS that a hydrogen leak, or a potential hydrogen leak, exists within the HPFCS, within at least one fuel cell stack of the HPFCS, and/or within one or more specific fuel cell stacks of the HPFCS. In some examples, the responding at 250 may include ceasing operation of the HPFCS and/or of at least one component of the HPFCS. This may include shutting down operation of the entire HPFCS, shutting down at least one fuel cell stack of the HPFCS, shutting down all fuel cell stacks of the HPFCS, ceasing production of hydrogen by the fuel processing assembly, and/or ceasing flow of the stored hydrogen stream to the fuel cell stack.

Methods 200 and/or controller 100 may be utilized with a wide variety of hydrogen-producing fuel processing systems 10 and/or HPFCS's 12. In the following discussion, and with reference to FIG. 1, examples of hydrogen-producing fuel cell systems 10 and HPFCS's 12 are schematically illustrated and described, but methods 200 are not limited to only being performed on, or within, the hydrogen-producing fuel cell systems and HPFCS's illustrated and/or described in FIG. 1.

With reference to FIG. 1, one or more feedstock stream(s) 16 may be delivered to hydrogen-producing region 19 of hydrogen-producing fuel processing system 10 via feedstock delivery system 22. In FIG. 1, feedstock stream(s) 16 are shown being delivered to hydrogen-producing region 19 by feedstock delivery system 22, which schematically represents any suitable mechanism, device, or combination thereof for selectively delivering feedstock stream(s) 16 to the hydrogen-producing region 19. For example, feedstock delivery system 22 may include one or more pumps that are adapted to deliver the components of feedstock stream(s) 16 from one or more supplies. Additionally or alternatively, feedstock delivery system 22 may include a valve assembly adapted to regulate the flow of the components of feedstock stream(s) 16 from a pressurized supply. This supply may be located external of fuel processing system 10, or they may be contained within or adjacent the fuel processing system 10. When feedstock stream(s) 16 are delivered to hydrogen-producing region 19 in more than one stream, the streams may be delivered by the same or separate feedstock delivery systems 22. Examples of feedstock delivery systems 22 are disclosed in U.S. Pat. Nos. 7,601,302, 6,375,906, 7,135,048, and 6,890,672, and in U.S. Patent Application Publication Nos. 2009/0155642 and 2019/0273275, the complete disclosures of which are hereby incorporated by reference.

The one or more feedstock streams 16 include at least a carbon-containing feedstock 18, and the one or more feedstock streams may include water 17, such as when the hydrogen-producing region is configured to produce mixed gas stream 20 from carbon-containing feedstock 18 and water 17 via a steam reforming reaction. When the hydrogen-producing region is configured to produce mixed gas stream 20 via a hydrogen-producing reaction such as a partial oxidation reaction, the one or more feedstock streams also may include an oxidant, such as oxygen gas, 15. When the hydrogen-producing region is configured to produce mixed gas stream 20 via an autothermal reaction, the one or more feedstock streams may include carbon-containing feedstock 16 and an oxidant, such as oxygen gas, 15. It is within the scope of the present disclosure that the one or more feedstock streams 16 additionally or alternatively may be referred to with respect to the components thereof, such as including a carbon-containing feedstock stream 18, a water stream 17, an oxidant or oxygen gas stream 15, and/or a mixed stream containing carbon-containing feedstock and water.

With this in mind, feedstock delivery system 22 may be configured to supply the one or more feedstock streams to hydrogen-producing region 19, such as by utilizing one or more pumps, compressors, or pressurized sources of the carbon-containing feedstock, water, and/or other feedstock components.

While a single feedstock stream 16 is shown in solid lines in FIG. 1, it is within the scope of the disclosure that more than one feedstock stream 16 may be used and that these streams may contain the same or different feedstocks. When feedstock stream 16 contains two or more components, such as carbon-containing feedstock 18 and water 17, the components may be delivered in the same or different feedstock streams. For example, when fuel processing system 10 is adapted to produce hydrogen gas from a carbon-containing feedstock and water, and optionally (at least until both streams are vaporized or otherwise gaseous), when they are not miscible with each other, these components are typically delivered in separate streams, such as shown in FIG. 1 by reference numerals 17 and 18 pointing to different feedstock streams.

When carbon-containing feedstock 18 is miscible with water, carbon-containing feedstock 18 may be delivered with the water component of feedstock stream 16, such as shown in FIG. 1 by reference numerals 17 and 18 pointing to the same feedstock stream 16. For example, when the hydrogen-producing region 19 receives a feedstock stream containing water and a water-soluble alcohol, such as methanol, these components may be premixed and delivered as a single stream. When hydrogen-producing region 19 receives a gaseous feedstock stream, the gaseous feedstock stream may be delivered to hydrogen-producing region 19 together with one or more of the liquid feedstock streams, or as a separate feedstock stream, such as shown in FIG. 1.

As illustrated in FIG. 1, fuel processing assembly 13 includes hydrogen-producing region 19. Hydrogen-producing region 19 may be configured to receive one or more feedstock streams 16 and to generate mixed gas stream 20 from the one or more feedstock streams 16 via a suitable hydrogen-producing region. Mixed gas stream 20 contains hydrogen gas as a majority component and contains other gasses, such as carbon monoxide, carbon dioxide, methane, unreacted carbon-containing feedstock 18, and steam. By "majority component," it is meant that hydrogen gas is present in the mixed gas stream in a greater concentration, or amount, than any of the other gasses. As examples, mixed gas stream 20 may include at least 50 wt %, at least 60 wt %, and/or at least 70 wt % hydrogen gas.

Hydrogen-producing region 19 may utilize any suitable process or mechanism to produce hydrogen gas from feedstock stream(s) 16 and may be contained within or external to a heated containment structure 70. Examples of suitable mechanisms by which hydrogen-producing region 19 may produce hydrogen gas from feedstock stream(s) 16, and as discussed, include steam reforming, autothermal reforming, and partial oxidation reforming.

In some examples, hydrogen-producing region 19 includes one or more reforming catalysts 23 that are configured to produce hydrogen gas from feedstock stream(s) 16 containing a carbon-containing feedstock stream 18 and water stream 17. In such examples, hydrogen-producing region 19 may include, may be referred to herein as, and/or may be a reformer 19. Examples of suitable carbon-containing feedstocks 18 include at least one hydrocarbon or alcohol. Examples of suitable hydrocarbons include methane, propane, natural gas, diesel, kerosene, gasoline, and the like. Examples of suitable alcohols include methanol, ethanol, various propanols, and polyols, such as ethylene glycol and propylene glycol.

Other suitable mechanisms for producing hydrogen gas from feedstock stream(s) 16 include ammonia decomposition, electrolysis of water, and water-gas-shift reactions. Illustrative, nonexclusive examples of suitable hydrogen-producing regions and/or mechanisms are disclosed in U.S. Pat. Nos. 6,537,352, 6,221,117, 5,997,594, 5,861,137, and in U.S. Patent Application Publication No. 2003/0223926, the complete disclosures of which are hereby incorporated by reference.

Steam reforming is an example of a hydrogen-producing mechanism that may be employed in hydrogen-producing region 19, in which feedstock stream 16 comprises water 17 and carbon-containing feedstock 18. In a steam reforming process, hydrogen-producing region 19 contains a suitable steam reforming catalyst 23, as indicated in dashed lines in FIG. 1. In such examples, the hydrogen-producing fuel processing system may be referred to as a steam reformer, hydrogen-producing region 19 may be referred to as a reforming region, and mixed gas stream 20 may be referred to as a reformate stream. As a more specific example, hydrogen-producing region 19 may employ a methanol steam reforming reaction and/or may be referred to as a methanol reforming region, and hydrogen-producing region 19 may include a methanol steam reforming catalyst 23 that is configured to produce, from methanol and water, a mixed gas stream 20 containing hydrogen gas as the majority component.

When hydrogen-producing region 19 includes reforming catalyst 23, reforming catalyst 23 may be non-pyrophoric, such that reforming catalyst 23 may be exposed to, or contacted with, air or oxygen without combusting and/or being deactivated. Examples of suitable steam reforming catalysts are disclosed in U.S. Pat. No. 7,128,769, the complete disclosure of which is hereby incorporated by reference. Additional examples of non-pyrophoric reforming catalysts that may be utilized in hydrogen-producing region 19 include a reforming catalyst sold under the trade name of KMA by Clariant and/or a reforming catalyst that contains zinc oxide supported on calcium aluminate.

Steam reformers typically operate at temperatures in the range of 200° C. (degrees Celsius) and 900° C., and at pressures in the range of 50 psi (pounds per square inch) and 300 psi, although temperatures and pressures outside of this range are within the scope of the disclosure. When the carbon-containing feedstock 18 is methanol, the hydrogen-producing steam reforming reaction, or the hydrogen-producing region 19, typically will operate in a hydrogen-producing temperature range of approximately 200-500° C. Illustrative subsets of this range include 275-375° C., 300-400° C., 350-450° C., 375-425° C., and 375-400° C.

When the carbon-containing feedstock is a hydrocarbon, ethanol, or a similar alcohol, a hydrogen-producing temperature range of approximately 400-900° C. typically will be used for the steam reforming reaction, or by hydrogen-producing region 19. Illustrative subsets of this range include 750-850° C., 725-825° C., 650-750° C., 700-800° C., 700-900° C., 500-800° C., 400-600° C., and 600-800° C.

It is within the scope of the present disclosure that hydrogen-producing region 19 may include two or more zones, or portions, each of which may be operated at the same or at different temperatures. For example, when carbon-containing feedstock 18 includes a liquid hydrocarbon, in some embodiments it may be desirable to include two different hydrogen-producing portions, with one operating at a lower temperature than the other to provide a pre-reforming region. In such an embodiment, fuel processing system 10 alternatively may be described as including two or more hydrogen-producing regions 19.

Hydrogen-producing fuel processing system 10 also may include a mixed gas filter 30 that is positioned downstream of hydrogen-producing region 19 and upstream of separation assembly 80, such that mixed gas stream 20 is passed through mixed gas filter 30 when mixed gas stream 20 is transferred from hydrogen-producing region 19 to separation assembly 80. Mixed gas filter 30 may be configured to filter mixed gas stream 20 to remove or lower the concentration of selected impurities that may be contained within mixed gas stream 20, and which may be detrimental to operation of separation assembly 80. For example, mixed gas filter 30 may be configured to remove one or more of particulate, sols, soot, and/or ash that may be present in mixed gas stream 20 when mixed gas stream 20 is released from hydrogen-producing region 19.

Fuel processing assembly 13 also may include separation assembly 80. The separation assembly may be configured to receive mixed gas stream 20 and to generate a byproduct stream 68 and product hydrogen stream 14, such as from the mixed gas stream. As an example, separation assembly 80 may be configured to separate mixed gas stream 20 into product hydrogen stream 14 and byproduct stream 68. Product hydrogen stream 14 contains a greater concentration of hydrogen gas than the mixed gas stream and contains a lower overall concentration of the other gasses than the mixed gas stream. Stated differently, byproduct stream 68 includes a major fraction, or a majority, of the other gasses. Product hydrogen stream 14 may contain pure or at least substantially pure hydrogen gas. Examples of separation assembly 80 include a membrane separation assembly 82 containing one or more hydrogen-selective membranes, and a pressure swing adsorption separation assembly 84. Examples of suitable separation assemblies 80 and components thereof are disclosed in U.S. Pat. Nos. 7,972,420, 10,476,093, 7,733,311, 7,399,342, and 7,837,765.

As used herein, at least substantially pure hydrogen gas may be greater than 90% pure, greater than 95% pure, greater than 99% pure, greater than 99.5% pure, and/or greater than 99.9% pure. In contrast, byproduct stream 68 contains a greater overall concentration of the other gasses than the mixed gas stream. The byproduct stream may contain hydrogen gas, but it contains a lower concentration of hydrogen gas than the mixed gas stream.

With continued reference to FIG. 1, the portion of mixed gas stream 20 that does not comprise product hydrogen stream 14 may include the impurities (other gasses) contained within mixed gas stream 20, as well as a portion of the hydrogen gas contained therein, and may be discharged from separation assembly 80 as byproduct stream 68. Byproduct stream 68 may be disposed of in any suitable manner, including being discharged to the environment external to hydrogen-producing fuel processing system 10, chemically treated and/or reacted prior to being discharged, supplied as a fuel stream to a burner assembly 92, utilized as a reactant stream for another chemical process, and/or stored for later use.

Fuel processing system 10 also may include a heating assembly 91, which may be configured to heat at least a portion of fuel processing system 10, such as hydrogen-producing region 19 and/or separation assembly 80. For example, heating assembly 91 may be configured to heat the portion of the fuel processing system to a suitable operating temperature, or operating temperature range, for producing hydrogen gas, purifying hydrogen gas, etc. As an example, heating assembly 91 may include a vaporization region, or a vaporizer, 94 that is configured to vaporize any liquid portion of feedstock stream(s) 16, such that feedstock streams 16 may be in a vaporized state when, upon, or prior to entering hydrogen-producing region 19.

As another example, heating assembly 91 may be configured to heat hydrogen-producing region 19 to a suitable hydrogen-producing temperature, examples of which are contained herein. In some examples, heating assembly 91 additionally or alternatively may be configured to maintain the portion of the fuel processing system at the operating temperature or a "primed" or "buffered" temperature during periods in which the hydrogen-producing region is not being utilized to produce hydrogen gas and/or is not producing more than a nominal amount of hydrogen gas, such as to maintain the HPFCS 12 in a standby or idle operating state. By doing so, it will take less time to heat hydrogen-producing region 19 to a hydrogen-producing temperature, as compared to a hydrogen-producing region 19 that is at ambient temperature. Examples of sources of electrical energy for electrical heating assembly 93 include energy supplied by energy storage device 50, fuel cell stack 40, and/or primary power source 52.

The primed, or buffered, temperature may be less than the operating, or hydrogen-producing, temperature of hydrogen-producing region 19, but greater than ambient temperature. For example, the primed, or buffered, temperature may be at least 100° C., at least 150° C., and/or at least 200° C. Additionally or alternatively, the primed, or buffered, temperature may be at least 25° C., at least 50° C., at least 75° C., at least 100° C., at least 150° C., at least 200° C., and/or at least 250° C. less than the hydrogen-producing temperature of hydrogen-producing region 19. Additional examples of suitable operating (i.e., hydrogen-producing and/or hydrogen-purifying), primed, and/or buffered temperature ranges and corresponding hydrogen-producing fuel cell systems and components thereof after disclosed in U.S. Pat. No. 7,659,019, the complete disclosure of which is hereby incorporated by reference.

Heating assembly 91 may utilize any suitable structure to supply heat to the internal compartment of heated containment structure 70, to the components contained therein, and/or to various components of fuel processing system 10. This may include burner assembly 92 and/or an electrical heating assembly 93. When heating assembly 91 includes burner assembly 92, the burner assembly may include one or more burners, and the fuel for burner assembly 92 may be provided by any suitable source. Examples of fuels for burner assembly 92 include byproduct stream 68, as discussed in more detail herein, product hydrogen stream 14, mixed gas stream 20, feedstock stream 16, carbon-containing feedstock 18, or any other suitable combustible fuel source.

As shown in FIG. 1, fuel processing system 10 may include a byproduct stream conduit 62. The byproduct stream conduit may be configured to direct byproduct stream 68 from separation assembly 80 to another portion of fuel processing system 10, such as a burner assembly 92 and/or externally from fuel processing system 10.

As discussed, hydrogen-producing fuel processing system 10 may include heated containment structure 70, which may define an internal compartment that may contain separation assembly 80, heating assembly 91, hydrogen-producing region 19, and/or a portion of feedstock delivery system 22, as well as any suitable valves, conduits, and/or piping associated with the above components. It also is within the scope of the present disclosure that heated containment structure 70 may include, or may contain, additional system components.

Any components contained within heated containment structure 70 may be maintained at substantially the same temperature, or may be maintained at different temperatures. This may be accomplished in any suitable manner, such as through the use of separate heating assemblies 91 for the various components contained within heated containment structure 70, the distance of a particular component from a heating assembly, internal structure such as baffles, supports, partitions, and/or the like to direct and/or control heat flow from the heating assembly, and/or the use of a plurality of heated containment structures, each with internal compartments that are maintained at separate temperatures and/or ranges of temperatures. It also is within the scope of the present disclosure that heated containment structure 70 may include insulation that may decrease the rate of heat transfer between the internal compartment of heated containment structure 70 and the environment and/or control the flow of heat among the components contained within the internal compartment.

In some examples, hydrogen-producing fuel processing systems 10 may comprise a polishing region 32 that receives product hydrogen stream 14 from separation assembly 80 and is configured to further purify, remove, reduce, and/or chemically react with selected impurities that may be present within product hydrogen stream 14. Examples of devices that may be utilized within polishing region 32 include water-shift reactors, and other devices that convert carbon monoxide to carbon dioxide, as well as methanation catalysts that convert carbon monoxide and hydrogen to methane and water. For example, when product hydrogen stream 14 is intended for use in a fuel cell system 42 that includes a proton exchange membrane (PEM) or another device that will be damaged if product hydrogen stream 14 includes more than determined concentrations of carbon monoxide or carbon dioxide, polishing region 32 may include at least one methanation catalyst bed.

As shown in FIG. 1, and as discussed, hydrogen-producing fuel processing system 10 includes low-pressure hydrogen storage tank 78, which is configured to receive at least a portion of product hydrogen stream 14 from fuel processing assembly 13, from separation assembly 80, and/or from polishing region 32, and store a volume of product hydrogen stream 14 as stored hydrogen gas 79. As illustrated, low-pressure hydrogen storage tank 78 may be configured to receive hydrogen gas from product hydrogen stream 14 prior to supply of product hydrogen stream 14 to at least one fuel cell stack 40 of fuel cell system 42 within stored hydrogen stream 112. Low-pressure hydrogen storage tank 78 may increase a stability in a pressure of product hydrogen stream 14 that is provided to the fuel cell stack(s) 40 and/or may decrease a potential for pressure variation in the pressure of product hydrogen stream 14 that is supplied to the fuel cell stack(s) 40. Additionally or alternatively, low-pressure hydrogen storage tank 78 may function as, or may be referred to herein as, a buffer tank, which may be configured to accommodate changes in demand for stored hydrogen gas 79 by fuel cells 44 and/or changes in production of produced hydrogen gas 25 by fuel processing assembly 13.

As discussed, HPFCS 12 may include stored hydrogen supply valve 118. The stored hydrogen supply valve may be configured to selectively regulate flow of the stored hydrogen stream within the stored hydrogen supply conduit 110. Examples of stored hydrogen supply valve 118 include a manually actuated valve, a quarter turn valve, a ball valve, a metering valve, an electrically actuated valve, a solenoid valve, and/or a pneumatically actuated valve.

As illustrated in dashed lines in FIG. 1, HPFCS 12 also may include a stored hydrogen supply pressure regulator 120. The stored hydrogen supply pressure regulator may be configured to selectively regulate a hydrogen supply pressure of stored hydrogen stream 112 that is received by fuel cell stack 40. With this in mind, and as illustrated, when hydrogen supply variable detector 130 includes pressure detector 132, the pressure detector may be positioned upstream from stored hydrogen supply pressure regulator 120. As more specific examples, the pressure detector may be configured to detect the hydrogen supply pressure in low-pressure hydrogen storage tank 78, downstream from the low-pressure hydrogen storage tank, upstream from stored hydrogen supply valve 118, and/or upstream from stored hydrogen supply pressure regulator 120.

As discussed, product hydrogen stream 14 produced by fuel processing system 10 may be delivered to one or more fuel cell stacks 40 of fuel cell system 42. A fuel cell stack is a device that produces an electrical potential from a source of protons, such as hydrogen gas, and an oxidant, such as oxygen gas. Accordingly, fuel cell stack 40 may be configured to receive at least a portion of product hydrogen stream 14 and a stream of (or containing) oxygen gas (which is typically delivered as an air stream), and to produce an electric current therefrom. This is schematically illustrated in FIG. 1, in which an air (or oxygen-containing) stream is indicated at 49, the fuel cell stack is indicated at 40, and electric current, or electrical power output, which is produced by the fuel cell stack is schematically illustrated at 41.

Each fuel cell stack 40 contains at least one, and typically multiple, fuel cells 44 that are adapted to produce an electric current from the oxidant and the portion of the product hydrogen stream 14 delivered thereto. The fuel cells typically are joined together between common end plates 48, which contain fluid delivery/removal conduits, although this construction is not required to all embodiments. Examples of suitable fuel cells 44 include proton exchange membrane (PEM) fuel cells, high-temperature proton exchange membrane fuel cells, low-temperature proton exchange membrane fuel cells, polybenzimidazole (BPI) membrane fuel cells, alkaline fuel cells, and phosphoric acid fuel cells, though other types of fuel cells also are within the scope of the present disclosure.

Electrical power output 41 from fuel cell system 42 may be stored for later use, such as through the use of an energy storage device 50, and/or utilized to satisfy an electrical load applied by energy-consuming device 46. Energy storage device 50 may include any suitable structure adapted to store at least a portion of the electrical power output from fuel cell system 42. Examples of energy storage devices 50 according to the present disclosure include any suitable battery, capacitor, ultracapacitor, supercapacitor, and flywheel. Additional examples of energy storage devices 50, HPFCS's 12 that include energy storage devices 50, and/or methods of operating such systems are disclosed in U.S. Pat. No. 11,316, 180, the disclosure of which is incorporated by reference. HPFCS 12 may include any suitable power management devices, such as a DC/DC converter, a rectifier, and the like, such as to rectify, increase, or decrease the voltage of, or otherwise manage or convert, electrical power output 41.

Examples of energy-consuming devices 46 include tools, lights or lighting assemblies, appliances (such as household or other appliances), households or other dwellings, offices or other commercial establishments, computers, signaling or communication equipment, telecommunication equipment, medical equipment, etc. Similarly, fuel cell stack 40 may be used to satisfy the power requirements of fuel cell system 42, which may be referred to as the balance-of-plant power requirements of the fuel cell system. Energy-consuming device 46 is schematically illustrated in FIG. 1 and is meant to represent one or more devices, or collection of devices, that are adapted to draw electric current from, or apply an electrical load to, fuel cell system 42.

It is within the scope of the present disclosure that energy-consuming device 46 optionally may be in electrical communication with a primary power source 52, which also may provide a primary power source electrical power output 54 to the hydrogen-producing fuel cell system. When energy-consuming device 46 is in electrical communication with the primary power source, HPFCS 12 may operate as an auxiliary and/or backup power system 56 adapted to satisfy the load applied by energy-consuming device 46 when primary power source 52 is unable to satisfy at least a portion of the applied load.

Primary power source 52 includes any suitable structure adapted to supply primary power source electrical power output 54 to satisfy the applied load from energy-consuming device 46. Examples of primary power sources include an electrical utility grid, a hydroelectric power source, a solar power source, a wind-powered power source, another fuel cell system, and/or an energy storage device or system. Some primary power sources may include an energy storage device, or system, in combination with another source of electrical power, such as a hydroelectric power source, a solar power source, and/or a wind-powered power source.

An example of the primary power source being unable to satisfy at least a portion of the applied load includes the primary power source being unable to satisfy the entire applied load, such as when the magnitude of the applied load is greater than the magnitude of the electrical power output available from the primary power source. Under these conditions, HPFCS 12 may supplement the electrical power output from the primary power source and also may be referred to as a supplemental power source 60.

Another example of the primary power source being unable to satisfy at least a portion of the applied load includes the primary power source being unable to satisfy any of the applied load, such as when there is no or only minimal electrical power output from the primary power source. Under these conditions, HPFCS 12 may provide backup power for energy-consuming device 46 and also may be referred to as a backup power source 58.

Yet another example of the primary power source being unable to satisfy at least a portion of the applied load includes the stability of the electrical power output from the primary power source being below a threshold stability level. Under these conditions, HPFCS 12 may provide some or all of the power to energy-consuming device 46 and may be referred to as supplemental power source 60 and/or backup power source 58.

As discussed, controller 100 may control the operation of at least a portion of hydrogen-producing fuel processing system 10 and/or HPFCS 12 based at least in part on the status of various components of hydrogen-producing fuel processing system 10 and/or calculations internal to the controller. Examples of status signals 102 may include controller 100 receiving status signals indicative of the operational state of the various components of hydrogen-producing fuel processing system 10, as well as the temperature of the components and/or the temperature, pressure, concentration, flow rate, and/or humidity of the streams contained therein. More specific examples include controller 100 receiving status signals 102 indicative of the hydrogen supply variable, the hydrogen flow rate, and/or the hydrogen supply pressure. Additional examples include controller 100 receiving status signals 102 indicative of the hydration level of the fuel cell stack, the electrical impedance of the fuel cell stack, the fuel cell stack current, the pressure within separation assembly 80, the temperature of the components within heated containment structure 70, and/or the ability of primary power source 52 to satisfy the electrical load applied by energy-consuming device 46.

In the context of methods 200, controller 100 may be programmed or otherwise configured to initiate supply of a stored hydrogen stream 112, including stored hydrogen gas 79, to fuel cell stack 40, such as via opening a stored hydrogen supply valve 118 that selectively permits or restricts flow of stored hydrogen stream 112 through stored hydrogen supply conduit 110. As another example, controller 100 may cause fuel cell stack 40 to generate electrical power output 41 and/or may monitor generation of the electrical power output by the fuel cell stack.

As yet another example, controller 100 may monitor the hydrogen supply variable that is indicative of flow of stored hydrogen stream 112 to fuel cell stack 40. The hydrogen supply variable may be monitored utilizing one or more hydrogen supply variable detectors 130 and may be monitored during a supply time interval that is subsequent to initiation of the supply of the stored hydrogen stream to the fuel cell stack. Stated differently, the hydrogen supply variable detector may be configured to detect a parameter that is indicative of the hydrogen supply variable.

As a more specific example, hydrogen supply variable detector 130 may include a pressure detector 132. Pressure detector 132, may be utilized to detect a hydrogen supply pressure of stored hydrogen gas 79, such as within and/or proximate low-pressure hydrogen storage tank 78. Upon initiation of supply of the stored hydrogen gas to the fuel cell stack, a certain decrease in the hydrogen supply pressure may be expected. However, controller 100 may be programmed to respond if, or only if, the decrease in the hydrogen supply pressure is greater than an expected hydrogen supply pressure change. Such a decrease may, for example, be a result of a hydrogen gas leak within HPFCS 12 and/or within fuel cell stack 40 thereof.

As another more specific example, hydrogen supply variable detector 130 may include a hydrogen flow meter 134. Hydrogen flow meter 134 may be utilized to detect a hydrogen supply flow rate of stored hydrogen gas 79, such as through stored hydrogen supply conduit 110, downstream from low-pressure hydrogen storage tank 78, and/or upstream from fuel cell stack 40. Upon initiation of supply of the stored hydrogen gas to the fuel cell stack, a certain hydrogen supply flow rate may be expected. However, controller 100 may be programmed to respond if, or only if, the hydrogen supply flow rate is greater than an expected flow rate. Such an increase in the hydrogen supply flow rate may, for example, be a result of the hydrogen leak within the HPFCS and/or within the fuel cell stack.

Additional examples of portions of hydrogen-producing fuel processing system 10 that may be monitored and/or controlled (i.e., adjusted, regulated, changed, maintained, etc.) by controller 100 include any valve, fluid handler, pump, compressor, flow-regulating device, temperature-regulating device, electrical energy regulating device, pressure-regulating device, and the like. More specific examples include controller 100 controlling the flow rate of feedstock stream(s) 16, such as by controlling the operation of the various pumps, compressors, valves, and/or mass flow controllers included in feedstock delivery system 22; controller 100 controlling the temperature of heated containment structure 70 and/or the various components of fuel processing system 10, such as by controlling the supply of electrical energy to electrical heating assembly 93 and/or the flow rate of combustible fuel and/or oxidant to burner assembly 92; controller 100 controlling the temperature of hydrogen-producing region 19, and/or separation assembly 80; controller 100 controlling the consumption of electrical power output 41 by energy-consuming device 46; controller 100 controlling the concentration of one or more materials contained within hydrogen-producing fuel processing system 10; controller 100 controlling the flow rate of the mixed gas stream 20, product hydrogen stream 14, oxidant-containing stream 49, and/or byproduct stream 68; controller 100 controlling the pressure within separation assembly 80; and/or controller 100 controlling the operation and/or operational state of the various components that comprise hydrogen-producing fuel processing system 10, such as feedstock delivery system 22, hydrogen-producing region 19, separation assembly 80, and/or fuel cell stack 40.

Controller 100 may include any suitable type and number of devices or mechanisms to implement and provide for the desired monitoring and/or control of one or more components of hydrogen-producing fuel processing system 10 and/or of the HPFCS 12. As examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into one or more systems or assemblies of hydrogen-producing fuel processing system 10 and/or HPFCS 12 or be a separate, stand-alone computing device. The controller may be adapted or otherwise programmed or designed to control the operation of hydrogen-producing fuel processing system 10 and/or HPFCS 12 in a plurality of operational regimes of the system, including the various components thereof.

As examples, controller 100 may include one or more of an electronic controller, a dedicated controller, a special-purpose controller, a personal computer, a special-purpose computer, a display device, a logic device, a memory device, and/or a memory device having computer-readable storage media. The computer-readable storage media, when present, also may be referred to herein as non-transitory computer readable storage media 106. This non-transitory computer readable storage media may include, define, house, and/or store computer-executable instructions, programs, and/or code; and these computer-executable instructions may direct hydrogen-producing fuel processing systems 10 and/or HPFCS 12 to perform any suitable portion, or subset, of methods 200.

Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

Additional examples of controllers 100 according to the present disclosure are described in U.S. Pat. Nos. 6,383,670, 6,495,277, 6,811,908, 6,835,481, 6,979,507, 7,208,241, and 7,390,587, as well as in U.S. Patent Application Publication Nos. 2005/0266284, 2005/0266285, 2006/0024540, 2006/0134473, and 2008/0176118, the complete disclosures of which are hereby incorporated by reference.

Hydrogen-producing fuel processing systems 10 and/or HPFCS's 12 according to the present disclosure may include (i.e., be configured and/or controlled to be operated at, or in) a plurality of operational regimes. Controller 100 may be utilized to configure or transition the hydrogen-producing fuel processing systems 10 and/or HPFCS's 12 to and/or between the plurality of operational regimes and/or to maintain the hydrogen-producing fuel processing systems 10 and/or HPFCS's 12 in a selected operational regime. An example of an operational (or operating) regime is a "hydrogen-producing" regime, in which the fuel processing system is generating the product hydrogen stream from the one or more feedstock streams in a suitable capacity to satisfy the hydrogen demand of fuel cell system 42 to produce an electrical power output. As discussed above, in the hydrogen-producing regime, the feedstock delivery system is supplying one or more feedstock streams to the hydrogen-producing region, the hydrogen-producing region is producing the mixed gas stream, and the separation assembly is separating the mixed gas stream into the product hydrogen stream and the byproduct stream.

Additional examples of an operational (or operating) regime include an "off" regime in which the fuel processing system may not be heated and is not receiving a feedstock stream or producing a mixed gas stream and a "primed" (and/or "idle") regime, in which the fuel processing system may be maintained at an elevated, thermally buffered, temperature but is not receiving the feedstock stream and/or producing the mixed gas stream. Examples of buffered, or primed, temperatures and temperature ranges are discussed herein.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method of operating a hydrogen-producing fuel cell system (HPFCS), the method comprising:
  initiating supply of a stored hydrogen stream, which includes stored hydrogen gas, to a fuel cell stack, wherein, prior to the initiating, the stored hydrogen gas is stored in a low-pressure hydrogen storage tank at a hydrogen storage pressure;
  generating an electrical power output from the stored hydrogen gas with the fuel cell stack;
  during a supply time interval, which is subsequent to the initiating, monitoring a hydrogen supply variable that is indicative of flow of the stored hydrogen stream to the fuel cell stack;
  detecting a change in the hydrogen supply variable; and
  responding to the detecting.

A2. The method of paragraph A1, wherein the initiating includes opening a stored hydrogen supply valve.

A3. The method of paragraph A2, wherein the HPFCS includes a stored hydrogen supply conduit, which is configured to convey the stored hydrogen stream from the low-pressure hydrogen storage tank to the fuel cell stack, and further wherein the opening the stored hydrogen supply valve includes permitting flow of stored hydrogen gas from the low-pressure hydrogen storage tank to the fuel cell stack via the stored hydrogen supply conduit.

A4. The method of any of paragraphs A1-A3, wherein the initiating includes flowing the stored hydrogen stream from the low-pressure hydrogen storage tank, through a stored hydrogen supply pressure regulator, and to the fuel cell stack, wherein the stored hydrogen supply pressure regulator is configured to regulate a supply pressure of the stored hydrogen gas to the fuel cell stack.

A5. The method of any of paragraphs A1-A4, wherein the hydrogen storage pressure is at least one of:
  (i) at least 75 kilopascals gauge (kPag); at least 80 kPag, at least 85 kPag, at least 90 kPag, at least 95 kPag, at least 100 kPag, at least 105 kPag, at least 110 kPag, at least 115 kPag, at least 120 kPag, at least 125 kPag, at least 130 kPag, at least 135 kPag, at least 140 kPag, at least 145 kPag, at least 150 kPag, at least 155 kPag, at least 160 kPag, at least 165 kPag, at least 170 kPag, at least 175 kPag, at least 180 kPag, at least 185 kPag, or at least 190 kPag; and
  (ii) at most 250 kPag, at most 240 kPag, at most 230 kPag, at most 220 kPag, at most 210 kPag, at most 200 kPag, at most 195 kPag, at most 190 kPag, at most 185 kPag, or at most 180 kPag.

A6. The method of any of paragraphs A1-A5, wherein the supply time interval at least one of:
  (i) begins immediately after the initiating; and
  (ii) is initiated by the initiating.

A7. The method of any of paragraphs A1-A6, wherein a duration of the supply time interval is at least one of:
  (i) at least 5 seconds, at least 10 seconds, at least 15 seconds, at least 20 seconds, at least 25 seconds, at least 30 seconds, at least 35 seconds, at least 40 seconds, at least 45 seconds, at least 50 seconds, at least 55 seconds, or at least 60 seconds; and
  (ii) at most 120 seconds, at most 110 seconds, at most 100 seconds, at most 90 seconds, at most 80 seconds, at most 70 seconds, at most 60 seconds, at most 55 seconds, at most 50 seconds, at most 45 seconds, at most 40 seconds, at most 35 seconds, or at most 30 seconds.

A8. The method of any of paragraphs A1-A7, wherein the HPFCS includes a hydrogen supply variable detector, and further wherein the monitoring includes monitoring the hydrogen supply variable utilizing the hydrogen supply variable detector.

A9. The method of any of paragraphs A1-A8, wherein the hydrogen supply variable includes, or is, a hydrogen supply pressure of stored hydrogen gas.

A10. The method of paragraph A9, wherein the monitoring includes monitoring the hydrogen supply pressure at least one of:
  (i) in the low-pressure hydrogen storage tank;
  (ii) downstream from the low-pressure hydrogen storage tank;
  (iii) upstream from a/the stored hydrogen supply valve; and
  (iv) upstream from a/the stored hydrogen supply pressure regulator.

A11. The method of any of paragraphs A1-A10, wherein the detecting includes detecting a change in the hydrogen supply variable that is greater than a threshold hydrogen supply variable change.

A12. The method of any of paragraphs A9-A11, wherein the detecting includes calculating, during the supply time interval, a change in the hydrogen supply pressure as a difference between the hydrogen supply pressure prior to the initiating and the hydrogen supply pressure subsequent to the initiating.

A13. The method of any of paragraphs A1-A12, wherein the threshold hydrogen supply variable change includes, or is, a threshold hydrogen supply pressure change, and optionally wherein the threshold hydrogen supply pressure change is 30 kPa, 35 kPa, 40 kPa, 45 kPa, 50 kPa, 55 kPa, 60 kPa, 65 kPa, 70 kPa, 75 kPa, 80 kPa, 85 kPa, 90 kPa, 95 kPa, 100 kPa, 105 kPa, 110 kPa, 115 kPa, 120 kPa, 125 kPa, 130 kPa, 135 kPa, or 140 kPa.

A14. The method of any of paragraphs A12-A13, wherein the threshold hydrogen supply pressure change is a threshold pressure change multiple of a nominal supply pressure change, which occurs during the supply time interval during normal operation of the HPFCS.

A15. The method of paragraph A14, wherein the threshold pressure change multiple is 1.5, 2, 2.5, 3, 3.5, 4, 4.5, 5, 5.5, 6, 6.5, or 7.

A16. The method of any of paragraphs A14-A15, wherein the nominal supply pressure change is at most 5 kPa, at most 7.5 kPa, at most 10 kPa, at most 12.5 kPa, at most 15 kPa, at most 17.5 kPa, or at most 20 kPa.

A17. The method of any of paragraphs A1-A16, wherein the hydrogen supply variable includes, or is, a hydrogen flow rate of the stored hydrogen stream.

A18. The method of paragraph A17, wherein the monitoring includes monitoring the hydrogen flow rate at least one of:
  (i) downstream from the low-pressure hydrogen storage tank; and (ii) upstream from the fuel cell stack.

A19. The method of any of paragraphs A1-A18, wherein the threshold hydrogen supply variable change includes, or is, a threshold hydrogen supply flow rate magnitude.

A20. The method of paragraph A19, wherein the threshold hydrogen supply flow rate magnitude is a threshold flow rate multiple of a nominal hydrogen flow rate magnitude, which occurs during the supply time interval and during normal operation of the HPFCS, and optionally wherein the threshold flow rate multiple is 1.5, 2, 2.5, 3, 3.5, 4, 4.5, 5, 5.5, 6, 6.5, or 7.

A21. The method of any of paragraphs A19-A20, wherein the fuel cell stack has maximum design wattage, and further wherein the threshold hydrogen supply flow rate magnitude is a wattage multiple of the maximum design wattage.

A22. The method of paragraph A21, wherein the wattage multiple is 18 standard liters per minute per kilowatt (SLPM/kW), 20 SLPM/kW, 30 SLPM/kW, 40 SLPM/kW, 50 SLPM/kW, 60 SLPM/kW, 70 SLPM/kW, 80 SLPM/kW, or 90 SLPM/kW.

A23. The method of any of paragraphs A1-A22, wherein the responding includes responding to the detecting if the change in the hydrogen supply variable differs from a threshold hydrogen supply variable change.

A24. The method of any of paragraphs A1-A23, wherein the responding includes determining that a hydrogen gas leak exists at least one of:
  (i) within the HPFCS;
  (ii) downstream from the low-pressure hydrogen storage tank; and
  (iii) within the fuel cell stack.

A25. The method of any of paragraphs A1-A24, wherein the initiating includes initiating supply of the stored hydrogen stream to a given fuel cell stack of a plurality of fuel cell stacks of the HPFCS, and further wherein the responding includes ceasing supply of the stored hydrogen stream to the given fuel cell stack.

A26. The method of paragraph A25, wherein the method further includes at least one of:
  (i) maintaining supply of the stored hydrogen stream to another fuel cell stack of the plurality of fuel cell stacks subsequent to the ceasing; and
  (ii) repeating the initiating to supply the stored hydrogen stream to the another fuel cell stack of the plurality of fuel cell stacks subsequent to the ceasing.

A27. The method of any of paragraphs A1-A26, wherein the responding includes initiating a system diagnostic test of the HPFCS.

A28. The method of any of paragraphs A1-A27, wherein the responding includes notifying an operator of the HPFCS that a potential hydrogen gas leak exists within the HPFCS.

A29. The method of any of paragraphs A1-A28, wherein the responding includes ceasing operation of the HPFCS.

A30. The method of any of paragraphs A1-A29, wherein the responding includes ceasing supply of the stored hydrogen stream to the fuel cell stack.

A31. The method of any of paragraphs A1-A30, wherein the method further includes producing hydrogen gas by:
  (i) providing a feedstock stream, which includes a carbon-containing feedstock, to a fuel processing assembly of the HPFCS;
  (ii) generating, with the fuel processing assembly from the feedstock stream, a product hydrogen stream, which includes produced hydrogen gas; and
  (iii) providing the product hydrogen stream to the low-pressure hydrogen storage tank as the stored hydrogen gas.

A32. The method of paragraph A31, wherein the method further includes determining that there is a demand for the electrical power output by an energy-consuming device, and further wherein both the initiating supply of stored hydrogen gas and the producing hydrogen gas are performed responsive to the determining.

A33. The method of paragraph A32, wherein the method further includes reducing a mass of stored hydrogen gas within the low-pressure hydrogen storage tank during a startup timeframe for the fuel processing assembly.

A34. The method of any of paragraphs A32-A33, wherein the supply time interval is an initial supply time, which at least one of:
  (i) begins immediately after the initiating; and
  (ii) is initiated by the initiating.

A35. The method of paragraph A31, wherein, subsequent to a/the startup timeframe for the fuel processing assembly, the method further includes at least one of:
  (i) replenishing the stored hydrogen gas via flow of the produced hydrogen gas stream to the low-pressure hydrogen storage tank; and
  (ii) pressurizing the low-pressure hydrogen storage tank, with the produced hydrogen gas stream, to the hydrogen storage pressure.

A36. The method of paragraph A35, wherein the supply time interval at least one of:
  (i) occurs during the replenishing; and
  (ii) occurs during the pressurizing.

A37. The method of any of paragraphs A1-A36, wherein the method further includes, during a purge time interval, purging the fuel cell stack utilizing the stored hydrogen stream, and further wherein the supply time interval is exclusive of the purge time interval.

A38. The method of paragraph A37, wherein the method includes omitting the responding during the purge time interval.

A39. The method of paragraph A37, wherein the omitting includes omitting during an omission time period that is a threshold omission time multiple of the purge time interval.

A40. The method of paragraph A39, wherein the threshold omission time multiple is at least one of:
  (i) at least 1.25, at least 1.5, at least 1.75, at least 2, at least 2.5, at least 3, at least 4, or at least 5; and
  (ii) at most 10, at most 9, at most 8, at most 7, at most 6, at most 5, at most 4, at most 3, or at most 2.

B1. A hydrogen-producing fuel cell system (HPFCS), comprising:
  a feedstock delivery system configured to provide a feedstock stream that includes a carbon-containing feedstock;
  a fuel processing assembly configured to receive the feedstock stream and to generate a product hydrogen stream, which includes produced hydrogen gas, from the feedstock stream;
  a low-pressure hydrogen storage tank configured to receive and store hydrogen gas as stored hydrogen gas;
  a fuel cell stack;
  a stored hydrogen supply conduit configured to convey a stored hydrogen stream, which includes the stored hydrogen gas to the fuel cell stack, wherein the fuel cell stack is configured to receive the stored hydrogen stream and to generate an electrical power output from the stored hydrogen stream; and
  a controller programmed to control the operation of the HPFCS according to the method of any of paragraphs A1-A40.

B2. The HPFCS of paragraph B1, wherein the low-pressure hydrogen storage tank is configured to receive and store at least a fraction of the product hydrogen stream as the stored hydrogen gas.

B3. The HPFCS of paragraphs B1-B2, wherein the fuel processing assembly includes a hydrogen-producing region configured to receive the feedstock stream and to generate a mixed gas stream, which includes hydrogen gas and other gasses, from the feedstock stream.

B4. The HPFCS of paragraph B3, wherein the hydrogen-producing region includes a reformer.

B5. The HPFCS of any of paragraphs B3-B4, wherein the fuel processing assembly includes a separation assembly configured to receive the mixed gas stream and to generate a byproduct stream, which includes a major fraction of the other gasses, and the product hydrogen stream.

B6. The HPFCS of paragraph B5, wherein the separation assembly includes at least one of a membrane separation assembly and a pressure swing adsorption separation assembly.

B7. The HPFCS of any of paragraphs B1-B6, wherein the HPFCS further includes a stored hydrogen supply valve configured to selectively regulate flow of the stored hydrogen stream within the stored hydrogen supply conduit.

B8. The HPFCS of any of paragraphs B1-B7, wherein the HPFCS further includes a stored hydrogen supply pressure regulator configured to regulate a hydrogen supply pressure of the stored hydrogen stream that is received by the fuel cell stack.

B9. The HPFCS of any of paragraphs B1-B8, wherein the HPFCS further includes a hydrogen supply variable detector configured to detect a parameter that is indicative of the hydrogen supply variable.

B10. The HPFCS of paragraph B9, wherein the hydrogen supply variable detector includes, or is, a pressure detector.

B11. The HPFCS of paragraph B10, wherein the pressure detector is configured to detect the hydrogen supply pressure at least one of:
  (i) in the low-pressure hydrogen storage tank;
  (ii) downstream from the low-pressure hydrogen storage tank;
  (iii) upstream from a/the stored hydrogen supply valve; and
  (iv) upstream from a/the stored hydrogen supply pressure regulator.

B12. The HPFCS of any of paragraphs B10-B11, wherein the hydrogen supply variable detector includes, or is, a hydrogen flow meter configured to detect a hydrogen supply flow rate of the stored hydrogen stream.

B13. The HPFCS of paragraph B12, wherein the hydrogen flow meter is configured to detect that hydrogen supply flow rate at least one of:
  (i) downstream from the low-pressure hydrogen storage tank; and
  (ii) upstream from the fuel cell stack.

C1. Non-transitory computer-readable storage media including computer-readable instructions that, when executed, direct a hydrogen-producing fuel cell system to perform the method of any of paragraphs A1-A40.

D1. The use of any of the methods of any of paragraphs A1-A40 with any of the hydrogen-producing fuel cell systems of any of paragraphs B1-B13.

D2. The use of any of the hydrogen-producing fuel cell systems of any of paragraphs B1-B13 with any of the methods of any of paragraphs A1-A40.

D3. The use of a hydrogen supply variable to indicate a hydrogen gas leak within a hydrogen-producing fuel cell system.

INDUSTRIAL APPLICABILITY

The hydrogen-producing fuel cell systems and methods disclosed herein are applicable to the hydrogen-production and energy-production industries, including fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of operating a hydrogen-producing fuel cell system (HPFCS), the method comprising:
  initiating supply of a stored hydrogen stream, which includes stored hydrogen gas, to a fuel cell stack, wherein, prior to the initiating, the stored hydrogen gas is stored in a low-pressure hydrogen storage tank at a hydrogen storage pressure;
  generating an electrical power output from the stored hydrogen gas with the fuel cell stack;
  during a supply time interval, which is subsequent to the initiating, monitoring a hydrogen supply variable that is indicative of flow of the stored hydrogen stream to the fuel cell stack, wherein the hydrogen supply variable includes a hydrogen supply pressure of stored hydrogen gas;
  detecting a change in the hydrogen supply variable that is greater than a threshold hydrogen supply variable change, wherein the detecting includes calculating, during the supply time interval, a change in the hydrogen supply pressure as a difference between the hydrogen supply pressure prior to the initiating and the hydrogen supply pressure subsequent to the initiating; and
  responding to the detecting.

2. The method of claim 1, wherein the hydrogen storage pressure is at least 75 kilopascals gauge (kPag) and at most 250 kPag.

3. The method of claim 1, wherein the supply time interval at least one of:

(i) begins immediately after the initiating; and
(ii) is initiated by the initiating.

4. The method of claim 1, wherein a duration of the supply time interval is at least 5 seconds and at most 120 seconds.

5. The method of claim 1, wherein the HPFCS includes a hydrogen supply variable detector, and further wherein the monitoring includes monitoring the hydrogen supply variable utilizing the hydrogen supply variable detector.

6. The method of claim 1, wherein the monitoring includes monitoring the hydrogen supply pressure at least one of:
(i) in the low-pressure hydrogen storage tank;
(ii) downstream from the low-pressure hydrogen storage tank;
(iii) upstream from a stored hydrogen supply valve; and
(iv) upstream from a stored hydrogen supply pressure regulator.

7. The method of claim 1, wherein the threshold hydrogen supply variable change includes a threshold hydrogen supply pressure change of 30 kPa.

8. The method of claim 7, wherein the threshold hydrogen supply pressure change is a threshold pressure change multiple of a nominal supply pressure change, which occurs during the supply time interval during normal operation of the HPFCS, wherein the threshold pressure change multiple is 1.5.

9. The method of claim 1, wherein the hydrogen supply variable includes a hydrogen flow rate of the stored hydrogen stream.

10. The method of claim 9, wherein the monitoring includes monitoring the hydrogen flow rate at least one of:
(i) downstream from the low-pressure hydrogen storage tank; and
(ii) upstream from the fuel cell stack.

11. The method of claim 10, wherein the threshold hydrogen supply variable change includes a threshold hydrogen supply flow rate magnitude.

12. The method of claim 11, wherein the threshold hydrogen supply flow rate magnitude is a threshold flow rate multiple of a nominal hydrogen flow rate magnitude, which occurs during the supply time interval and during normal operation of the HPFCS, wherein the threshold flow rate multiple is 1.5.

13. The method of claim 11, wherein the fuel cell stack has a maximum design wattage, and further wherein the threshold hydrogen supply flow rate magnitude is a wattage multiple of the maximum design wattage, wherein the wattage multiple is 18 standard liters per minute per kilowatt.

14. The method of claim 1, wherein the responding includes determining that a hydrogen gas leak exists at least one of:
(i) within the HPFCS;
(ii) downstream from the low-pressure hydrogen storage tank; and
(iii) within the fuel cell stack.

15. The method of claim 1, wherein the responding includes at least one of:
(i) initiating a system diagnostic test of the HPFCS;
(ii) notifying an operator of the HPFCS that a potential hydrogen gas leak exists within the HPFCS;
(iii) ceasing operation of the HPFCS; and
(iv) ceasing supply of the stored hydrogen stream to the fuel cell stack.

16. The method of claim 1, wherein the initiating includes initiating supply of the stored hydrogen stream to a given fuel cell stack of a plurality of fuel cell stacks of the HPFCS, and further wherein the responding includes ceasing supply of the stored hydrogen stream to the given fuel cell stack.

17. The method of claim 16, wherein the method further includes at least one of:
(i) maintaining supply of the stored hydrogen stream to another fuel cell stack of the plurality of fuel cell stacks subsequent to the ceasing; and
(ii) repeating the initiating to supply the stored hydrogen stream to the another fuel cell stack of the plurality of fuel cell stacks subsequent to the ceasing.

18. The method of claim 1, wherein the method further includes producing hydrogen gas by:
(i) providing a feedstock stream, which includes a carbon-containing feedstock, to a fuel processing assembly of the HPFCS;
(ii) generating, with the fuel processing assembly from the feedstock stream, a product hydrogen stream, which includes produced hydrogen gas; and
(iii) providing the product hydrogen stream to the low-pressure hydrogen storage tank as the stored hydrogen gas.

19. The method of claim 18, wherein the method further includes determining that there is a demand for the electrical power output by an energy-consuming device, and further wherein both the initiating supply of stored hydrogen gas and the producing hydrogen gas are performed responsive to the determining.

20. The method of claim 18, wherein, subsequent to a startup timeframe for the fuel processing assembly, the method further includes at least one of:
(i) replenishing the stored hydrogen gas via flow of the produced hydrogen gas to the low-pressure hydrogen storage tank; and
(ii) pressurizing the low-pressure hydrogen storage tank, with the produced hydrogen gas, to the hydrogen storage pressure.

21. The method of claim 20, wherein the supply time interval at least one of:
(i) occurs during the replenishing; and
(ii) occurs during the pressurizing.

22. The method of claim 1, wherein the method further includes, during a purge time interval, purging the fuel cell stack utilizing the stored hydrogen stream, and further wherein the supply time interval is exclusive of the purge time interval.

23. A hydrogen-producing fuel cell system (HPFCS), comprising:
a feedstock delivery system configured to provide a feedstock stream that includes a carbon-containing feedstock;
a fuel processing assembly configured to receive the feedstock stream and to generate a product hydrogen stream, which includes produced hydrogen gas, from the feedstock stream;
a low-pressure hydrogen storage tank configured to receive at least a fraction of the product hydrogen stream and to store the at least a fraction of the product hydrogen stream as stored hydrogen gas;
a fuel cell stack;
a stored hydrogen supply conduit configured to convey a stored hydrogen stream, which includes the stored hydrogen gas to the fuel cell stack, wherein the fuel cell stack is configured to receive the stored hydrogen stream and to generate an electrical power output from the stored hydrogen stream; and a controller programmed to control the operation of the HPFCS according to the method of claim 1.

24. Non-transitory computer-readable storage media including computer-readable instructions that, when executed, direct a hydrogen-producing fuel cell system to perform the method of claim 1.

* * * * *